United States Patent
Aratani et al.

(10) Patent No.: US 9,584,768 B2
(45) Date of Patent: Feb. 28, 2017

(54) INFORMATION PROCESSING APPARATUS, INFORMATION PROCESSING METHOD AND COMPUTER-READABLE STORAGE MEDIUM

(71) Applicant: CANON KABUSHIKI KAISHA, Tokyo (JP)

(72) Inventors: Shinichi Aratani, Kawasaki (JP); Kazuki Takemoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 536 days.

(21) Appl. No.: 13/683,667

(22) Filed: Nov. 21, 2012

(65) Prior Publication Data
US 2013/0135463 A1 May 30, 2013

(30) Foreign Application Priority Data

Nov. 30, 2011 (JP) ................................. 2011-262653

(51) Int. Cl.
*H04N 7/18* (2006.01)
*G06T 7/00* (2006.01)

(52) U.S. Cl.
CPC ............ *H04N 7/18* (2013.01); *G06T 7/0002* (2013.01); *G06T 7/0044* (2013.01); *G06T 2207/30168* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| 5,796,386 | A  | 8/1998  | Lipscomb et al. |
|-----------|----|---------|-----------------|
| 6,792,370 | B2 | 9/2004  | Satoh et al.    |
| 7,035,760 | B2 | 4/2006  | Kobayashi et al.|
| 7,130,754 | B2 | 10/2006 | Satoh et al.    |
| 7,558,689 | B2 | 7/2009  | Anabuki et al.  |
| 7,752,008 | B2 | 7/2010  | Satoh et al.    |

(Continued)

FOREIGN PATENT DOCUMENTS

| CN | 1497244 A | 5/2004 |
|----|-----------|--------|
| CN | 1210543 C | 7/2005 |

(Continued)

OTHER PUBLICATIONS

Home&Learn, "Microsoft Excel 2007 Conditional Formatting", May 29, 2010, Home&Learn.*

(Continued)

*Primary Examiner* — Said Broome
*Assistant Examiner* — Yu-Jang Tswei
(74) *Attorney, Agent, or Firm* — Fitzpatrick, Cella, Harper & Scinto

(57) ABSTRACT

An information processing apparatus includes an image obtaining unit that obtains an image captured by an image capturing apparatus. An index detection unit detects index information from the image. A measurement value obtaining unit obtains a measurement value measured by a sensor. A determination unit determines a suitability of calibration data for the sensor, which includes the index information and the measurement value, based on the index information and the measurement value. A presentation unit presents the suitability.

38 Claims, 17 Drawing Sheets

(56) References Cited

U.S. PATENT DOCUMENTS

| | | |
|---|---|---|
| 7,970,576 B2 | 6/2011 | Satoh |
| 8,019,148 B2 | 9/2011 | Morita et al. |
| 8,073,201 B2 | 12/2011 | Satoh et al. |
| 8,103,127 B2 | 1/2012 | Yonezawa et al. |
| 8,130,385 B2 | 3/2012 | Satoh et al. |
| 2003/0182072 A1 | 9/2003 | Satoh et al. |
| 2004/0133379 A1 | 7/2004 | Kobayashi et al. |
| 2004/0249594 A1 | 12/2004 | Satoh et al. |
| 2005/0253871 A1 | 11/2005 | Anabuki et al. |
| 2005/0261573 A1 | 11/2005 | Satoh et al. |
| 2008/0228422 A1* | 9/2008 | Satoh .................. G01C 11/00 702/92 |
| 2008/0232659 A1* | 9/2008 | Tajima et al. .................. 382/128 |
| 2008/0240550 A1 | 10/2008 | Morita et al. |
| 2008/0267531 A1* | 10/2008 | Satoh .................. G06K 9/209 382/289 |
| 2009/0022369 A1* | 1/2009 | Satoh et al. .................. 382/106 |
| 2010/0030849 A1* | 2/2010 | Miyamoto et al. ........... 709/203 |
| 2012/0173185 A1* | 7/2012 | Taylor et al. .................. 702/104 |

FOREIGN PATENT DOCUMENTS

| | | |
|---|---|---|
| CN | 1865842 A | 11/2006 |
| CN | 101286234 A | 10/2008 |
| EP | 1596218 A2 | 11/2005 |
| JP | 2000-186288 A | 7/2000 |
| JP | 2003-269913 A | 9/2003 |
| JP | 2004-118734 A | 4/2004 |
| JP | 2004-151085 A | 5/2004 |
| JP | 2006-153848 A | 6/2006 |
| JP | 2008-046687 A | 2/2008 |
| JP | 2008-064735 A | 3/2008 |
| JP | 4077385 B2 | 4/2008 |
| JP | 2008-249407 A | 10/2008 |
| JP | 2008-261755 A | 10/2008 |
| JP | 2008-275340 A | 11/2008 |
| WO | 2006082928 A1 | 8/2006 |

OTHER PUBLICATIONS

Satoh et al., "Techniques in Mixed Reality", Transactions of the Virtual Reality Society of Japan, vol. 8, No. 2, pp. 171-180, 2003.
Satoh et al., "A head tracking method using bird's-eye view camera and gyroscope," Proc. 3rd IEEE/ACM Int'l Symp. on Mixed and Augmented Reality (ISMAR 2004), pp. 202-211, 2004.
Chinese Office Action issued in counterpart Chinese Patent Application No. 201210520455.7, dated Feb. 2, 2015.
Japanese Office Action dated Dec. 19, 2014, issued in corresponding Japanese Patent Application No. 2011-262653.
Chinese Official Action dated Sep. 25, 2015, issued in counterpart Chinese Patent Application No. 201210520455.7, with an English translation.

* cited by examiner

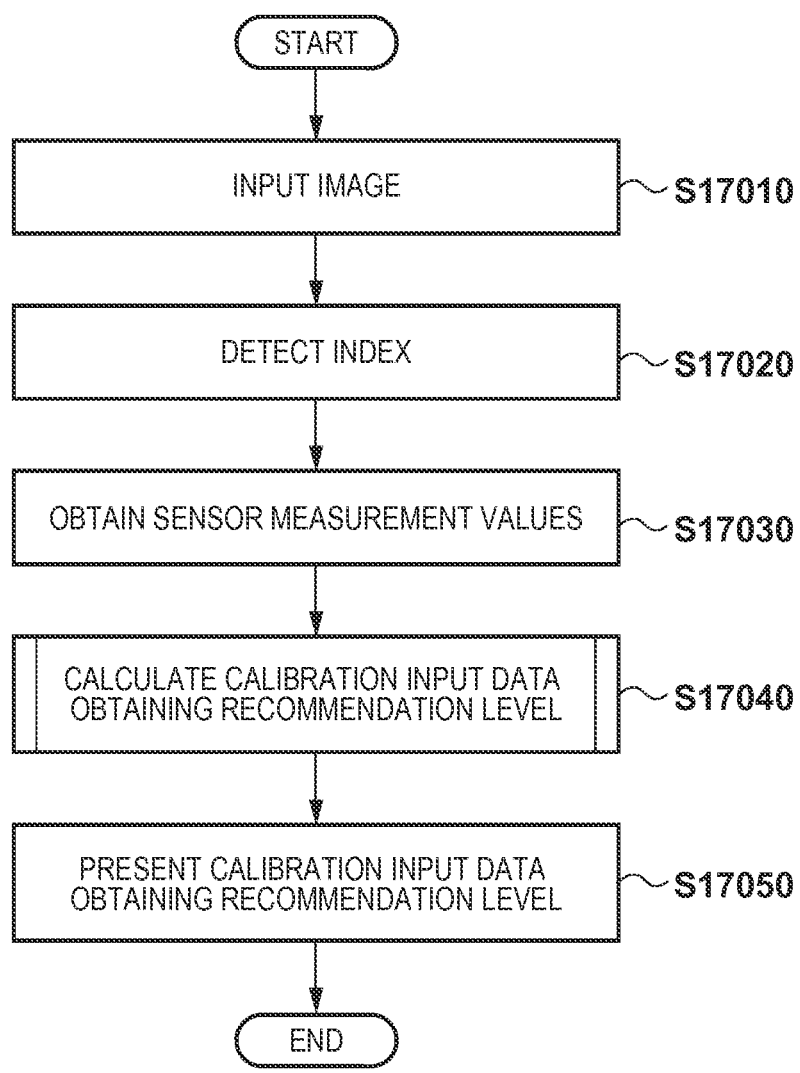

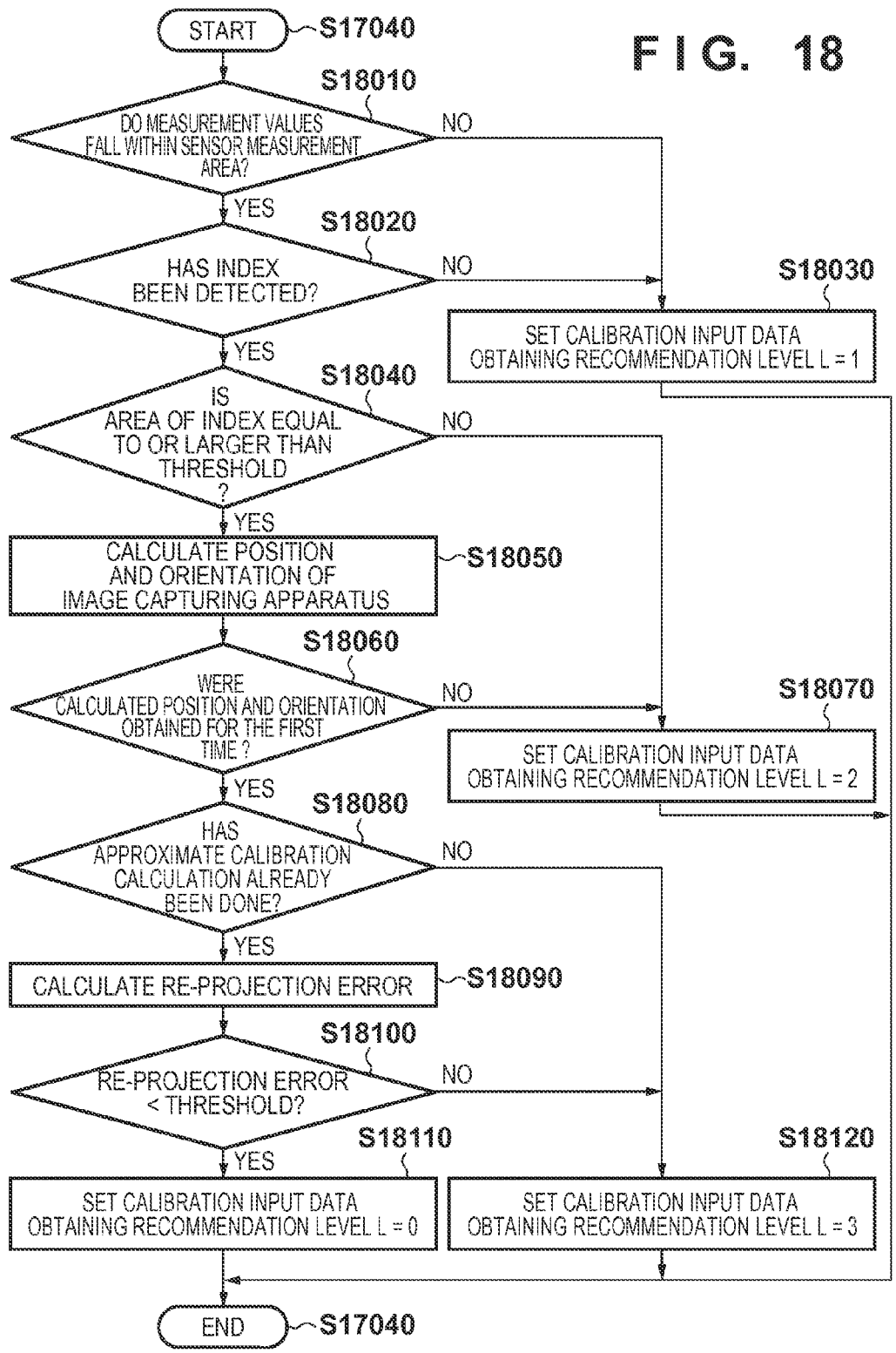

INFORMATION PROCESSING APPARATUS, INFORMATION PROCESSING METHOD AND COMPUTER-READABLE STORAGE MEDIUM

CLAIM OF PRIORITY

This application claims the benefit of Japanese Patent Application No. 2011-262653, filed on Nov. 30, 2011, which is hereby incorporated by reference herein in its entirety.

BACKGROUND OF THE INVENTION

Field of the Invention

The present invention relates to an information processing apparatus, an information processing method, and a computer-readable storage medium.

Description of the Related Art

In recent years, MR (Mixed Reality) technology is a subject of active study. MR technology refers to a technology of seamlessly combining a real space with a virtual space generated by a computer. MR technology is expected to be applied to various fields, such as assembly support, for displaying the operation procedure and the state of wiring in superposition at the time of an assembly operation, and surgery support, for displaying the state of the interior of the body of a patient in superposition on his or her body surface.

To make the user feel as if a virtual object really exists in a real space, geometrical consistency between the virtual object and the real space is of prime importance. The geometrical consistency in MR (Mixed Reality) includes consistency for matching the coordinate system of a real space with that of a virtual space, and consistency for correctly representing the depth relationship between a real object and a virtual object. A problem associated with the former consistency is also called a registration problem in MR (Mixed Reality), and various research reports have been presented (see, for example, K.Satoh, S.Uchiyama, and H.Tamura, "Registration Techniques in Mixed Reality," Transactions of the Virtual Reality Society of Japan, Vol. 8, No. 2, pp. 171-180, 2003). The registration problem is posed when the position and orientation are matched between an image capturing apparatus for capturing a video at the observer's eyepoint, and a real object on which virtual information is to be displayed in superposition. This registration problem will be dealt with in the present invention.

As methods of measuring the position and orientation of an image capturing apparatus, (1) a method of using the measurement values obtained by a sensor capable of simultaneously measuring both the position and orientation, (2) a method of using the measurement value obtained by a sensor that measures the orientation, and image information of an index detected from an image captured by the image capturing apparatus, (3) a method of using image information of an index detected from an image captured by the image capturing apparatus to correct the measurement values obtained by a sensor capable of simultaneously measuring both the position and orientation, are typically available (see, for example, K.Satoh, S.Uchiyama, and H.Tamura, "Registration Techniques in Mixed Reality," Transactions of the Virtual Reality Society of Japan, Vol. 8, No. 2, pp. 171-180, 2003, and K.Satoh, S.Uchiyama, and H.Yamamoto, "A head tracking method using bird's-eye view camera and gyroscope," Proc. 3rd IEEE/ACM Int'l Symp. on Mixed and Augmented Reality (ISMAR 2004), pp. 202-211, 2004). In general, a magnetic or an optical sensor is used as a position and orientation sensor that measures the position and orientation, while a gyro inertial sensor is used as an orientation sensor that measures the orientation.

To mount an orientation sensor or a position and orientation sensor on an image capturing apparatus to obtain the position or orientation of the image capturing apparatus or object using the sensor measurement value, it is necessary to measure, in advance, the position or orientation of the orientation sensor or the position and orientation sensor relative to the image capturing apparatus to be measured. Obtaining the arrangement information, that is, the position or orientation of the sensor relative to the object to be measured will be referred to as "sensor calibration" hereafter.

Japanese Patent Laid-Open No. 2006-153848 discloses a sensor calibration method of mounting an index and a position and orientation sensor, or an orientation sensor, on an object to obtain, as calibration information, the arrangement information of the position and orientation sensor or the orientation sensor mounted on the object relative to the object. An image is obtained by capturing an object, a sensor measurement value is input, and information associated with the image coordinate position of an index is detected from the image, thereby obtaining calibration information using the sensor measurement value and the information associated with the image coordinate position of the index. The measurement value obtained by a position and orientation sensor or an orientation sensor, and the image information of an index detected in an image, which are required to calibrate the sensor using the image, will be referred to as calibration input data hereafter.

To calibrate the sensor, it is necessary to obtain calibration input data at various positions and orientations. Also, because the accuracy of calibration input data considerably influences the sensor calibration result, it is necessary not only to input the measurement values obtained by a highly accurate sensor, but also to detect an index from a captured image with high accuracy. When the index is captured as a small object in the image, or a blur occurs in a captured image as the image capturing apparatus rotates or moves at a high speed, the index detection accuracy degrades. Therefore, the accuracy of the calibration result degrades when sensor calibration input data obtained in such a case is input and used for calculation.

Also, in Japanese Patent Laid-Open No. 2008-046687, to reduce calibration input data that leads to degradation in accuracy of sensor calibration so as to improve the calibration accuracy, a virtual three-dimensional object that indicates a target image capturing position and orientation is presented in obtaining calibration input data.

As in Japanese Patent Laid-Open No. 2006-153848, however, when the sensor is calibrated based on the sensor measurement value and the image information of an index, it is difficult for an operator who has neither knowledge nor expertise in sensor calibration to determine whether the input data is suitable for this calibration.

This is because, even if the measurement values fall within the measurement area of the position and orientation sensor, they do not always have a uniform measurement accuracy, and locally vary in sensor measurement accuracy, depending on the surrounding environment and the measurement position. More specifically, a magnetic position and orientation sensor is known to be vulnerable to a surrounding magnetic field and incapable of obtaining correct measurement values, depending on the magnetic field strain. Also, an optical position and orientation sensor has a position or orientation measurement accuracy, which locally varies depending on the accuracy of its lens distortion correction parameters and camera parameters. When this happens, the measurement accuracy is often high in the vicinity of the lens center; that is, at the center of the measurement area of the optical position and orientation sensor, but low in the vicinity of, for example, the boundary of the measurement area. Therefore, for accurate sensor calibration, the operator must obtain calibration input data in consideration of the characteristics and surrounding environment of the sensor.

It is also necessary to capture the index as a sufficiently large object in the image at various positions and orientations with no blur within the measurement area of the sensor. Especially, when the sensor measurement area is wide, it is difficult for an operator who has no expertise to obtain the sensor measurement values at various positions and orientations while determining whether the data is suitable for calibration.

In Japanese Patent Laid-Open No. 2008-046687, the target position and orientation of the image capturing apparatus can be presented to obtain calibration input data. However, this patent literature discloses no technique of determining whether the calibration input data is suitable at the position where calibration input data is obtained, in consideration of the characteristics and surrounding environment of the sensor. In addition, to present a correct target position and orientation, it is necessary to obtain an accurate position and orientation of the image capturing apparatus. However, since sensor calibration is done to obtain an accurate position and orientation of the image capturing apparatus, it is naturally impossible to obtain an accurate position and orientation of the image capturing apparatus before sensor calibration.

Hence, although a target position and orientation can be presented based on an approximate calibration result, it is difficult to determine whether the input data is suitable for calibration at the position where calibration input data is actually obtained.

The present invention has been made in consideration of the above-mentioned problem, and provides a technique of allowing even an operator who has neither knowledge nor expertise in sensor calibration to easily obtain sensor calibration input data, and to determine whether the calibration input data is suitable for accurate calibration.

SUMMARY OF THE INVENTION

According to one aspect, the present invention provides an information processing apparatus comprising an image obtaining unit configured to obtain an image captured by an image capturing apparatus, an index detection unit configured to detect index information from the image, a measurement value obtaining unit configured to obtain a measurement value of at least one of a position and an orientation measured by a position and orientation sensor, a determination unit configured to determine a suitability of calibration data for the position and orientation sensor, which includes the index information and the measurement value, based on the index information and the measurement value, respectively, and a presentation unit configured to present the suitability.

According to another aspect, the present invention provides an information processing method comprising obtaining an image captured by an image capturing apparatus, detecting index information from the image, obtaining a measurement value of at least one of a position and an orientation measured by a position and orientation sensor, determining a suitability of calibration data for the position and orientation sensor, which includes the index information and the measurement value, based on the index information and the measurement value, respectively, and presenting the suitability.

Further features of the present invention will become apparent from the following description of exemplary embodiments with reference to the attached drawings.

BRIEF DESCRIPTION OF THE DRAWINGS

FIG. 17 is a flowchart showing the procedure of a process of displaying the obtaining recommendation level of calibration input data in the seventh embodiment; and FIG. 18 is a flowchart showing the procedure of a process of calculating the obtaining recommendation level of calibration input data in the seventh embodiment.

DESCRIPTION OF THE EMBODIMENTS

An exemplary embodiment(s) of the present invention will now be described in detail with reference to the drawings. It should be noted that the relative arrangement of the components, the numerical expressions, and numerical values set forth in these embodiments do not limit the scope of the present invention unless it is specifically stated otherwise.

First Embodiment

An information processing apparatus according to this embodiment calculates and displays a recommendation level in obtaining input data for calculating the arrangement information of a position and orientation sensor mounted on an image capturing apparatus relative to the image capturing apparatus. The information processing apparatus according to this embodiment will be described below.

Figure 1:
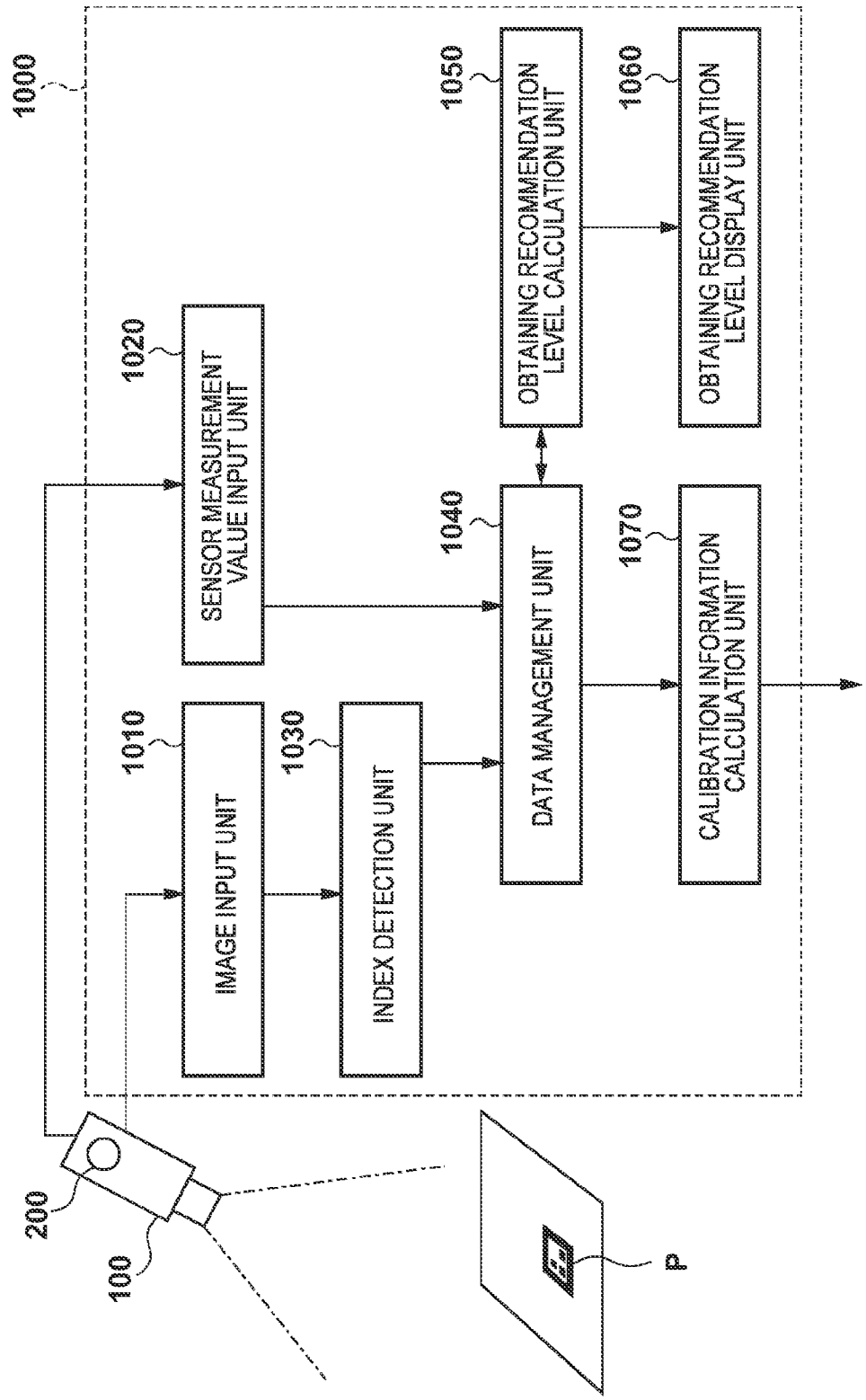
FIG. 1 is a block diagram showing the schematic configuration of an information processing apparatus 1000 in the first embodiment.

FIG. 1 shows the schematic configuration of an information processing apparatus 1000 according to this embodiment. The information processing apparatus 1000 includes an image input unit 1010, a sensor measurement value input unit 1020, a index detection unit 1030, a data management unit 1040, an obtaining recommendation level calculation unit 1050, an obtaining recommendation level display unit 1060, and a calibration information calculation unit 1070. Also, the information processing apparatus 1000 is connected to an image capturing apparatus 100 and to a position and orientation sensor 200.

Note that the position and orientation sensor 200 to be calibrated is mounted on the image capturing apparatus 100. An image capturing apparatus coordinate system is determined upon defining one point on the image capturing apparatus 100 as its origin, and three orthogonal axes as its X-, Y-, and Z-axes. The position and orientation of the position and orientation sensor 200 in the image capturing apparatus coordinate system are unknown. The unknown position and orientation of the position and orientation sensor 200 in the image capturing apparatus coordinate system are a set of information to be calibrated.

One or a plurality of indices P to be captured by the image capturing apparatus 100 are arranged in a real space. A coordinate system determined upon defining one point in the real space as its origin and three orthogonal axes as its X-, Y-, and Z-axes is called a world coordinate system. An index $P^k$ (k=1, . . . , K) having a known position in the world coordinate system is set. It is desired to set an index $P^k$ so that the image capturing apparatus 100 observes pieces of information of at least three points.

The index $P^k$ may be formed by, for example, circular markers having different colors, or feature points having different features, such as natural features. However, a quadrangular index formed by a quadrangular region having a certain area can also be used. The index $P^k$ may take any form as long as it can be used to detect an image coordinate position in a captured image and uniquely identified.

The image input unit 1010 obtains an image output from the image capturing apparatus 100, and outputs the image to the index detection unit 1030.

The sensor measurement value input unit 1020 obtains the measurement values of the position and orientation from the position and orientation sensor 200, and outputs these measurement values to the data management unit 1040. The measurement values output from the position and orientation sensor 200 generally indicate the position and orientation of the position and orientation sensor 200 itself in a sensor coordinate system uniquely defined by the sensor. In this case, the sensor measurement value input unit 1020 multiplies the measurement values output from the position and orientation sensor 200 by a transformation matrix from the sensor coordinate system having known values into a world coordinate system to transform the position and orientation of the position and orientation sensor 200 itself in the sensor coordinate system into those in the world coordinate system. The sensor measurement value input unit 1020 outputs a rotation matrix (to be symbolized by "$R_{WS}$" hereafter), representing the transformed orientation to the data management unit 1040.

The index detection unit 1030 detects the coordinate position of the index $P^k$ in the image obtained by the image input unit 1010. For example, if each index $P^k$ is formed by markers having different colors, a region corresponding to each marker color is detected from the image, and its barycentric position is defined as the detection coordinate position of this index $P^k$. However, if each index $P^k$ is formed by feature points having different texture features, template matching is performed using a template image of this index $P^k$, which is held as known information in advance, thereby detecting the position of this index $P^k$. If a quadrangular index is used as each index $P^k$, the image is binarized and labeled to detect, as index candidates, indices formed by straight lines from a region having a predetermined area or more. Further, it is determined whether a specific pattern is present in the candidate regions to exclude erroneously detected candidates, and to obtain the direction and identifier of each index. Note that, in this embodiment, four quadrangular indices, each formed by four vertices are assumed to be detected in this way, and are represented as indices $P^{kn}$. In this case, n (n=1, 2, 3, 4) is an index or suffix for each detected index $P^{kn}$.

The index detection unit 1030 outputs an image coordinate position $u^{Pkn}$ and an identifier $k_n$ of each detected index $P^{kn}$ to the data management unit 1040 as index detection information (index information). If the index detection unit 1030 cannot detect any index, it outputs a notification to that effect to the data management unit 1040 as index detection information (index information).

The obtaining recommendation level calculation unit 1050 obtains the index detection information and sensor measurement values from the data management unit 1040 as calibration input data candidates. Based on the obtained calibration input data candidates, the obtaining recommendation level calculation unit 1050 calculates an obtaining recommendation level according to which it is determined whether the obtained calibration input data is to be used to calculate calibration information. The obtaining recommendation level calculation unit 1050 outputs the calculated obtaining recommendation level to the obtaining recommendation level display unit 1060 and data management unit 1040.

The obtaining recommendation level display unit 1060 displays to the operator (not shown) the obtaining recommendation level obtained from the obtaining recommendation level calculation unit 1050. The operator (not shown) moves the image capturing apparatus 100, on which the position and orientation sensor 200 is mounted, to a position having a high obtaining recommendation level.

The data management unit 1040 obtains the obtaining recommendation level from the obtaining recommendation level calculation unit 1050, and outputs calibration input data to the calibration information calculation unit 1070.

The calibration information calculation unit 1070 obtains the calibration input data from the data management unit 1040, calculates calibration information, and outputs the calibration information.

The procedure of a process of displaying the obtaining recommendation level of calibration input data by the information processing apparatus 1000 according to this embodiment will be explained with reference to a flowchart shown in FIG. 2. Note that program codes according to this flowchart are stored in a memory (not shown), such as a RAM or a ROM in the information processing apparatus 1000, and read out and executed by a CPU (not shown).

In step S2010, the image input unit 1010 obtains an image from the image capturing apparatus 100. In step S2020, the index detection unit 1030 detects an index $P^{kn}$ from the image. The index detection unit 1030 outputs an image coordinate position $u^{P^{kn}}$ and identifier $k_n$ of the detected index $P^{kn}$ to the data management unit 1040 as detection information. If the index detection unit 1030 cannot detect any index, it outputs a flag indicating to that effect to the data management unit 1040 as detection information.

In step S2030, the sensor measurement value input unit 1020 obtains an orientation RWS and position TWS as measurement values from the position and orientation sensor 200, and outputs them to the data management unit 1040.

With the above-mentioned processes in steps S2010, S2020, and S2030, the data management unit 1040 can obtain sensor measurement values and index detection information. In step S2040, the obtaining recommendation level calculation unit 1050 calculates the obtaining recommendation level.

The obtaining recommendation level of calibration input data will be described herein. The obtaining recommendation level is numeric data indicating the degree of suitability of the input data as calibration input data to be used to calculate calibration information. If it is determined that the input data cannot be used to calculate calibration information because of the insufficiency of information, an obtaining recommendation level L is set to L=1. If it is determined that the input data can be used to calculate calibration information, but nonetheless, is unsuitable for accurate calibration, the obtaining recommendation level L is set to L=2. If it is determined that the input data should be actively used for accurate calibration, the obtaining recommendation level L is set to L=3. If the input data is unnecessary for sensor calibration because, for example, calibration was previously done or input data was previously obtained at the same position, the obtaining recommendation level L is set to L=0. A process of calculating an obtaining recommendation level will be described in detail later with reference to a flowchart shown in FIG. 3.

In step S2050, the obtaining recommendation level display unit 1060 displays the obtaining recommendation level calculated in step S2040 to the operator.

Figure 5:
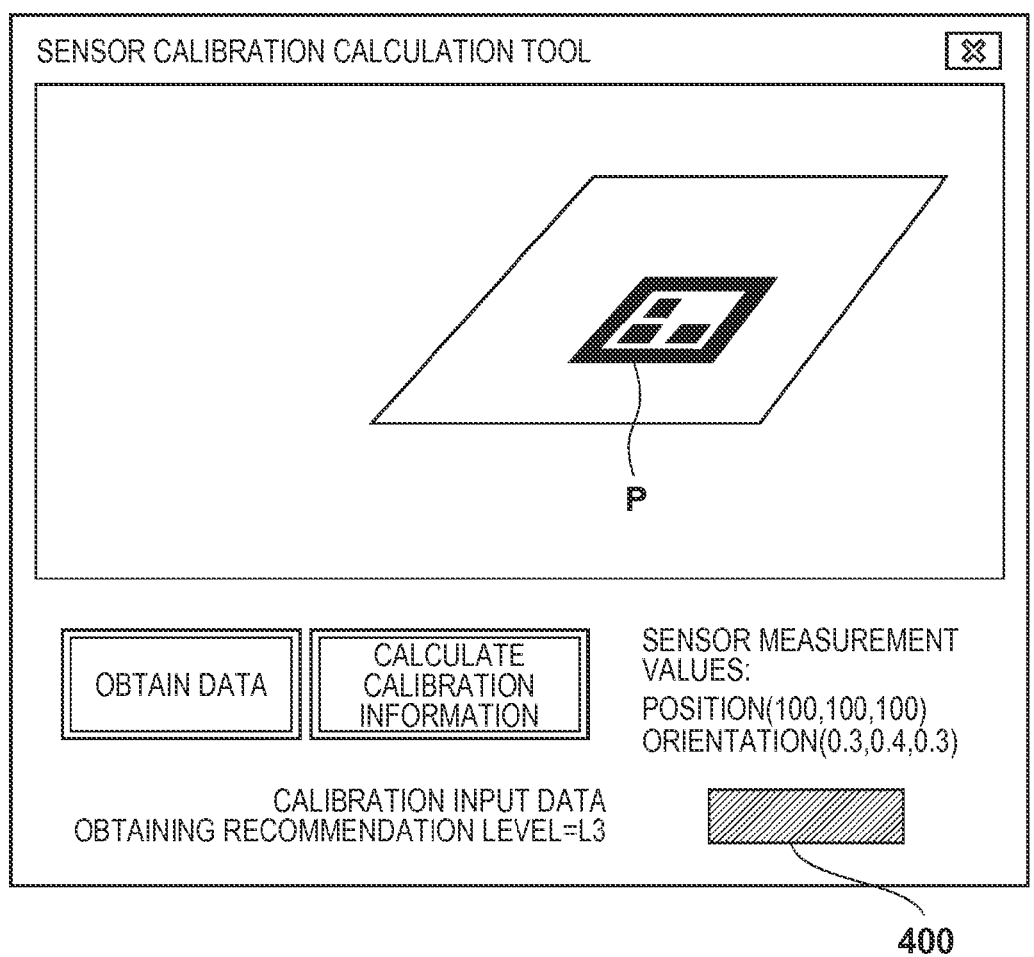
FIG. 5 is a view showing a method of displaying the obtaining recommendation level of calibration input data in the first embodiment.

An example of how to display an obtaining recommendation level will be described with reference to FIG. 5. A liquid crystal display (not shown) as an accessory to a PC for use in calibration calculation can be used as the obtaining recommendation level display unit 1060. Upon classifying obtaining recommendation levels into colors as, for example, light blue for L=0, red for L=1, yellow for L=2, and blue for L=3, a color corresponding to the obtaining recommendation level is displayed in a region 400 shown in FIG. 5. Note that any color may be assigned to each level as long as it allows the distinction between different levels. Alternatively, different texture patterns or different luminances may be assigned to respective levels. Any method may be used as long as it allows distinction between different levels. The operator moves the image capturing apparatus 100 on which the position and orientation sensor 200 is mounted, so that the obtaining recommendation level displayed on the liquid crystal display is represented by a color corresponding to L=3. This makes it possible to obtain input data suitable for calibration.

Also, sensor calibration requires input data at various positions and orientations of the image capturing apparatus 100, on which the position and orientation sensor 200 is mounted. Therefore, when the measurement area is wide, or depending on the position or orientation at which input data is obtained, in a case when the operator is away from the liquid crystal display, it is difficult for the operator to read the sensor measurement values from the liquid crystal display. However, as in this embodiment, the use of different colors to display respective obtaining recommendation levels makes it possible to easily determine whether the input data is suitable for calibration, even if the operator moves to a position where he or she can hardly read the sensor measurement values. It is, therefore, possible to easily determine whether the input data is suitable for calibration, regardless of the position where calibration input data is obtained.

With the above-mentioned process, the information processing apparatus 1000 calculates and displays an obtaining recommendation level in obtaining input data for calculating the arrangement information of the position and orientation sensor 200 mounted on the image capturing apparatus 100. Hence, even an operator who has neither knowledge nor expertise in sensor calibration can easily obtain calibration input data suitable for sensor calibration. Upon the above-mentioned operation, a series of processes in the flowchart shown in FIG. 2 ends.

Figure 3:
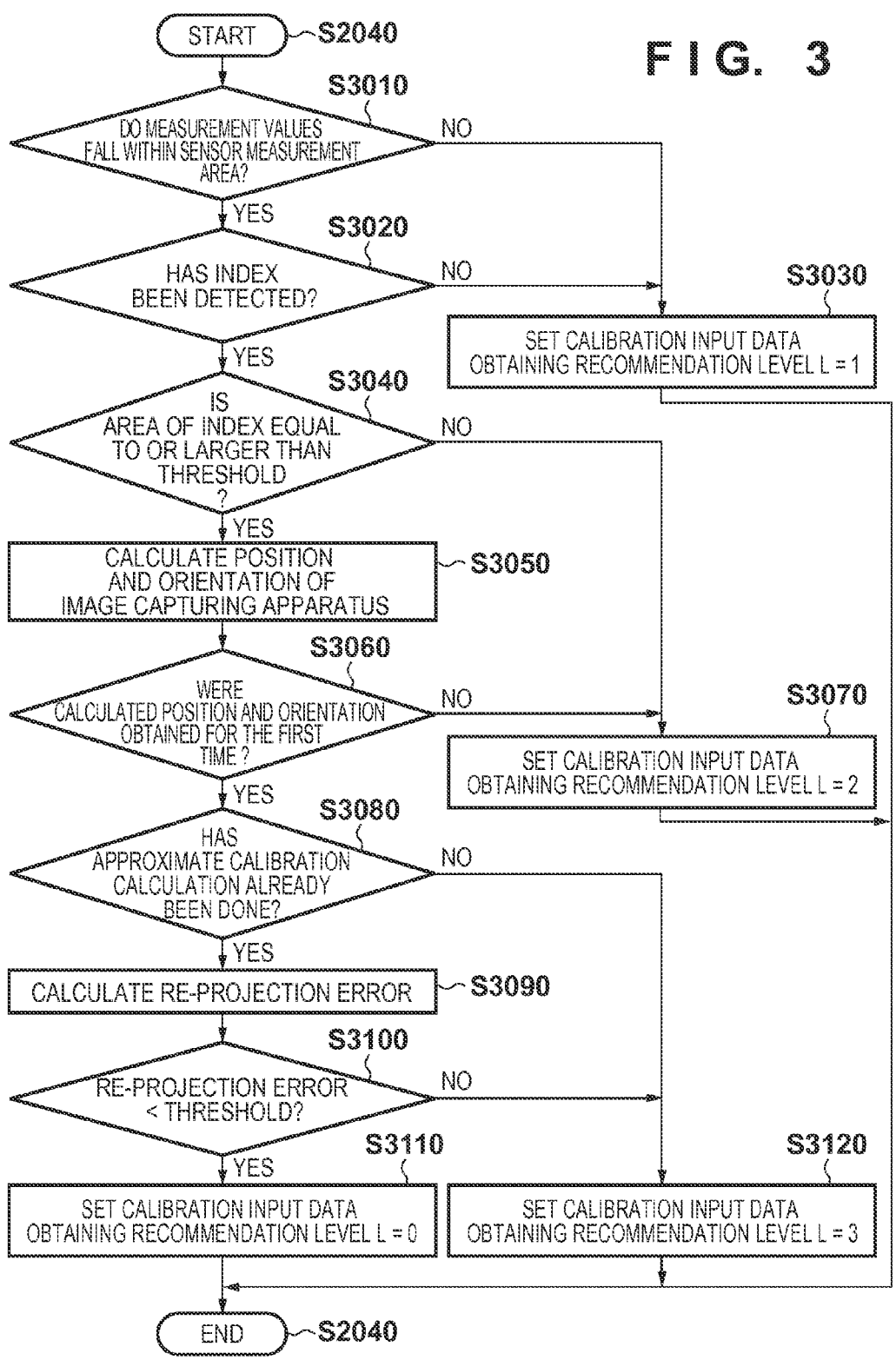
FIG. 3 is a flowchart showing the procedure of a process of calculating the obtaining recommendation level of calibration input data in the first embodiment.

The process of calculating an obtaining recommendation level in step S2040 will be described in detail below with reference to a flowchart shown in FIG. 3.

In step S3010, the obtaining recommendation level calculation unit 1050 determines whether the measurement values obtained by the position and orientation sensor 200 fall within the sensor measurement area. That is, the obtaining recommendation level calculation unit 1050 determines whether these measurement values fall within the range in which a given accuracy is guaranteed. As for a magnetic position and orientation sensor, the sensor measurement area is generally continuous, and the range in which a given accuracy is guaranteed is often determined depending on the distance from a sensor transmitter to a receiving sensor. In such a magnetic position and orientation sensor, if the measurement values obtained by the position and orientation sensor 200 fall within the distance from a sensor transmitter to a receiving sensor, they are determined to fall within the sensor measurement area; otherwise, they are determined to fall outside the sensor measurement area. Also, in a general optical sensor, the position and orientation cannot be measured when the object to be measured falls outside the fields of a plurality of cameras serving as optical sensors. Therefore, if the object to be measured falls outside the fields of a minimum number of cameras capable of measuring the position and orientation, the measurement values obtained by the position and orientation sensor 200 are determined to fall outside the sensor measurement area. If it is determined that the measurement values obtained by the position and orientation sensor 200 fall within the sensor measurement area (YES in step S3010), the process advances to step S3020. On the other hand, if it is determined that the measurement values obtained by the position and orientation sensor 200 fall outside the sensor measurement area (NO in step S3010), the process advances to step S3030.

In step S3020, the obtaining recommendation level calculation unit 1050 determines whether an index could be detected from the image. If it is determined that an index could be detected (YES in step S3030), the process advances to step S3040. On the other hand, if it is determined that no index could be detected (NO in step S3030), the process advances to step S3030.

In step S3030, the obtaining recommendation level calculation unit 1050 sets the obtaining recommendation level L to L=1 to indicate the insufficiency of information of the input data. The process then ends.

In step S3040, the obtaining recommendation level calculation unit 1050 calculates the area of the detected index in the image to determine whether this area is equal to or larger than a threshold. For example, if the detected index has a quadrangular shape, it is determined whether the area of the quadrangle in the image of this index is equal to or greater than a threshold. If it is determined that the area of the index is equal to or greater than the threshold (YES in step S3040), the process advances to step S3050. On the other hand, if it is determined that the area of the index is less than the threshold (NO in step S3040), the process advances to step S3070.

In step S3050, the obtaining recommendation level calculation unit 1050 calculates the position and orientation of the image capturing apparatus 100 based on the detected index. As a method of calculating the position and orientation of the image capturing apparatus 100, a known method can be used. For example, if a quadrangular index set on a plane is detected, the position and orientation of the image capturing apparatus may be calculated by obtaining planar homography. Also, if six or more points are detected, the DLT (Direct Linear Transformation) method may be used. Further, a more accurate position and orientation of the image capturing apparatus 100 may be obtained by nonlinear optimization calculation using the calculated position and orientation of the image capturing apparatus 100 as initial values. The position and orientation of the image capturing apparatus 100 may be obtained based on the detected index, using any other methods.

In step S3060, the obtaining recommendation level calculation unit 1050 compares the position and orientation of the image capturing apparatus 100 calculated in step S3050 with those of the image capturing apparatus 100 held in the data management unit 1040 as calibration input data. The obtaining recommendation level calculation unit 1050 then determines whether the position and orientation of the image capturing apparatus 100 calculated in step S3050 were obtained for the first time. More specifically, if the difference in position of the image capturing apparatus is less than a threshold, and the difference in orientation of the image capturing apparatus is also less than a threshold, it is determined that an image was previously captured at nearly the same position and orientation; otherwise, it is determined that the position and orientation of the image capturing apparatus 100 calculated in step S3050 were obtained for the first time. If it is determined that the position and orientation of the image capturing apparatus 100 calculated in step S3050 were obtained for the first time (YES in step S3060), the process advances to step S3080. On the other hand, if it is determined that the position and orientation of the image capturing apparatus 100 calculated in step S3050 were already obtained previously (NO in step S3060), the process advances to step S3070.

In step S3070, the obtaining recommendation level calculation unit 1050 sets the obtaining recommendation level L to L=2 to indicate that the input data has sufficient information required to calculate calibration information but nonetheless is expected to have a large error. The process then ends.

In step S3080, the obtaining recommendation level calculation unit 1050 determines whether approximate calibration calculation has already been done. If it is determined that approximate calibration calculation has already been done (YES in step S3080), the process advances to step S3090. On the other hand, if approximate calibration calculation has not yet been done (NO in step S3080), the process advances to step S3120.

In step S3090, the obtaining recommendation level calculation unit 1050 calculates a re-projection error $\Delta u^{Pkn}$, that is, the difference between a detection coordinate position $u^{Pkn}$ of an index $P^{kn}$ and a coordinate position $u'^{Pkn}$ of the index $P^{kn}$, which is estimated based on the approximate calibration calculation result, the sensor measurement values, and the three-dimensional position of the index $P^{kn}$ obtained in advance.

A method of calculating a re-projection error $\Delta u^{Pkn}$ for one index in an image captured by the image capturing apparatus 100 at a given position and orientation will be described herein. The re-projection error $\Delta u^{Pkn}$ is obtained by:

$$\Delta u^{Pkn} = u^{Pkn} - u'^{Pkn}. \tag{1}$$

Let $x_C^{Pkn} = [x_C^{Pkn}, y_C^{Pkn}, z_C^{Pkn}]$ be the position of the index $P^{kn}$ in the image capturing apparatus coordinate system, and f be the focal length. Then, the estimated coordinate position $u'^{Pkn} = [u'^{Pkn}_x, u'^{Pkn}_y]$ of the index $P^{kn}$ is given by:

$$u'^{Pkn} = \begin{bmatrix} u'^{Pkn}_x & u'^{Pkn}_y \end{bmatrix}^T = \begin{bmatrix} -f\frac{x_C^{Pkn}}{z_C^{Pkn}} & -f\frac{y_C^{Pkn}}{z_C^{Pkn}} \end{bmatrix}^T. \tag{2}$$

Let t be the three-dimensional vector representing the position of a three-dimensional coordinate system A relative to a three-dimensional coordinate system B, and R be the 3×3 rotation matrix representing the orientation. Then, using a 4×4 matrix $M_{BA}$ defined as:

$$M_{BA} = \begin{bmatrix} R & t \\ 0 & 1 \end{bmatrix} \tag{3}$$

a coordinate position xB (three-dimensional vector), on the coordinate system B, of a point at a position xA (three-dimensional vector) on the coordinate system A is represented by a homogeneous coordinate system as:

$$\begin{bmatrix} x_B \\ 1 \end{bmatrix} = M_{BA} \begin{bmatrix} x_A \\ 1 \end{bmatrix}. \tag{4}$$

In this embodiment, the 4×4 matrix $M_{BA}$ is used in a technique of representing the position and orientation of the coordinate system A relative to the coordinate system B.

Let $M_{WS}$ be the position and orientation of the position and orientation sensor 200 mounted on the image capturing apparatus 100 in the world coordinate system, which are based on the measurement values obtained by the position and orientation sensor 200. Also, in this embodiment, the position and orientation are represented by a six-dimensional vector, as will be described below. The position and orientation are represented by ternary vectors $x=[x\ y\ z]^T$ and $\omega=[\xi\ \psi\ \zeta]^T$, respectively. Although various methods of representing the orientation by a ternary value are available, the orientation is represented by a ternary vector having a magnitude that defines the rotation angle and a direction that defines the direction of the rotation axis in this case. The position x and orientation $\omega$ are combined into a vector $a=[x\ y\ z\ \xi\ \psi\ \zeta]T$.

A 4×4 matrix MCS representing the position and orientation of the position and orientation sensor 200 mounted on the image capturing apparatus 100 in the image capturing apparatus coordinate system is represented by a six-dimensional vector $a_{CS}=[x_{CS}\ y_{CS}\ z_{CS}\ \xi_{CS}\ \omega_{CS}\ \zeta_{CS}]^T$. Transformation from $M_{CS}$ into $a_{CS}$ can be done using a known method.

Letting $x_W^{Pkn}$ be the position of the index $P^{kn}$ in the world coordinate system obtained in advance, and $M_{CS}$ be a function of $a_{CS}$ as a known parameter, the position $x_C^{Pkn}$ of the index $P^{kn}$ in the image capturing apparatus coordinate system is given by:

$$x_C^{Pkn}=[x_c^{Pkn}\ y_c^{Pkn}\ z_c^{Pkn}\ 1]T=M_{CS}(a_{CS})\cdot M_{WS}^{-1}\cdot x_W^{Pkn}. \qquad (5)$$

A re-projection error can be obtained by setting the function aCS describing the approximate calibration calculation result as an initial value, and substituting equations (5) and (2) into equation (1).

In step S3100, the obtaining recommendation level calculation unit 1050 determines whether the re-projection error calculated in step S3090 is less than a threshold. If it is determined that the re-projection error is less than the threshold (YES in step S3100), the process advances to step S3110. On the other hand, if it is determined that the re-projection error is equal to or greater than the threshold (NO in step S3100), the process advances to step S3120.

In step S3110, the obtaining recommendation level calculation unit 1050 sets the obtaining recommendation level L to L=0 to indicate that the position and orientation specified in the input data need not be used for sensor calibration. The process then ends.

In step S3120, the obtaining recommendation level calculation unit 1050 sets the obtaining recommendation level L to L=3 to indicate that it is determined that the input data should be actively used to calculate sensor calibration information. The process then ends. Upon the above-mentioned operation, a series of processes in the flowchart shown in FIG. 3 ends. Although obtaining recommendation levels L=0 to 3 are obtained in this case, it may simply be determined whether the input data is suitable for calculating calibration information.

Figure 4:
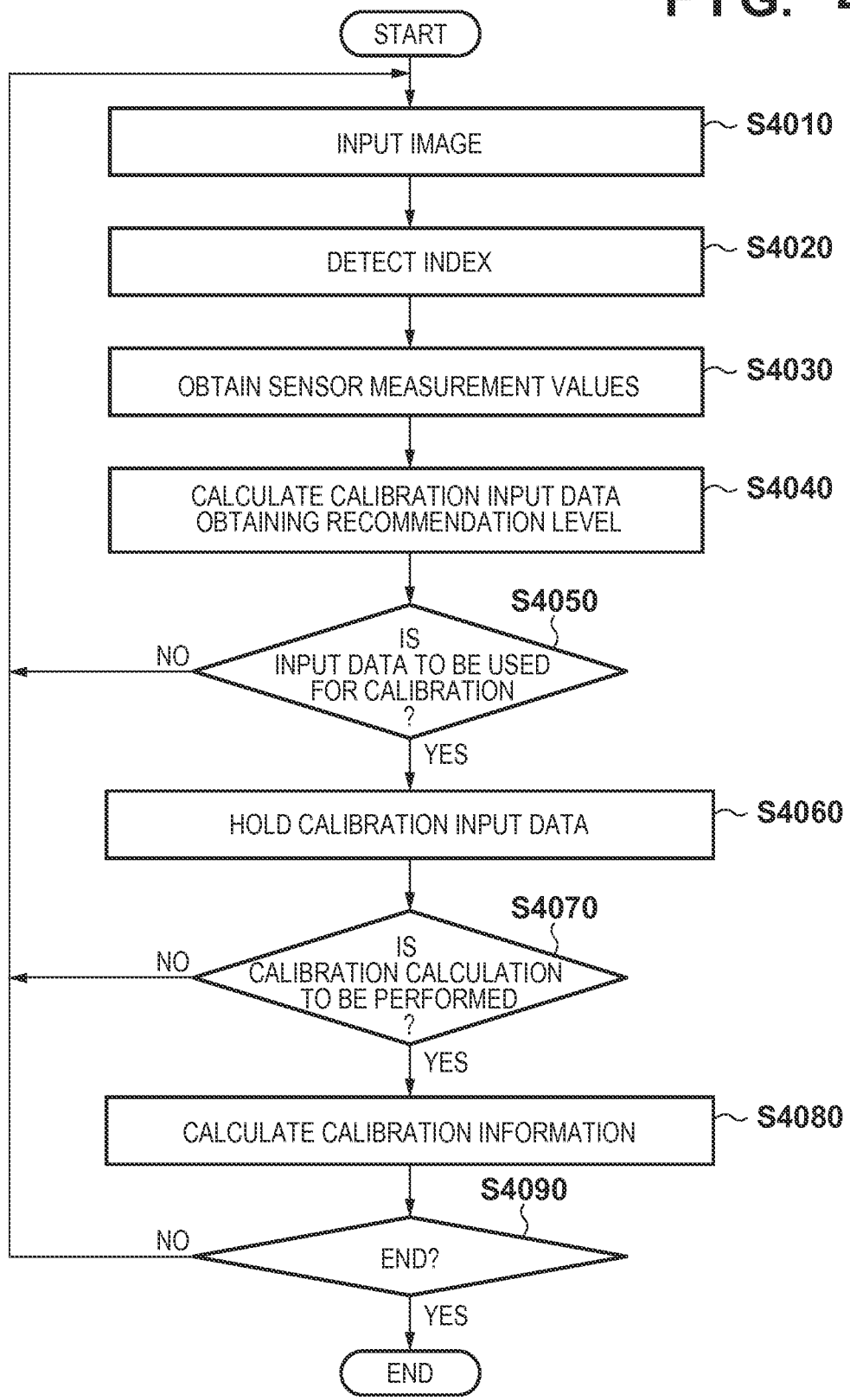
FIG. 4 is a flowchart showing the procedure of a process of calculating sensor calibration information in the first embodiment.

A process of calculating sensor calibration information based on the obtaining recommendation level will be described below with reference to a flowchart shown in FIG. 4.

Figure 2:
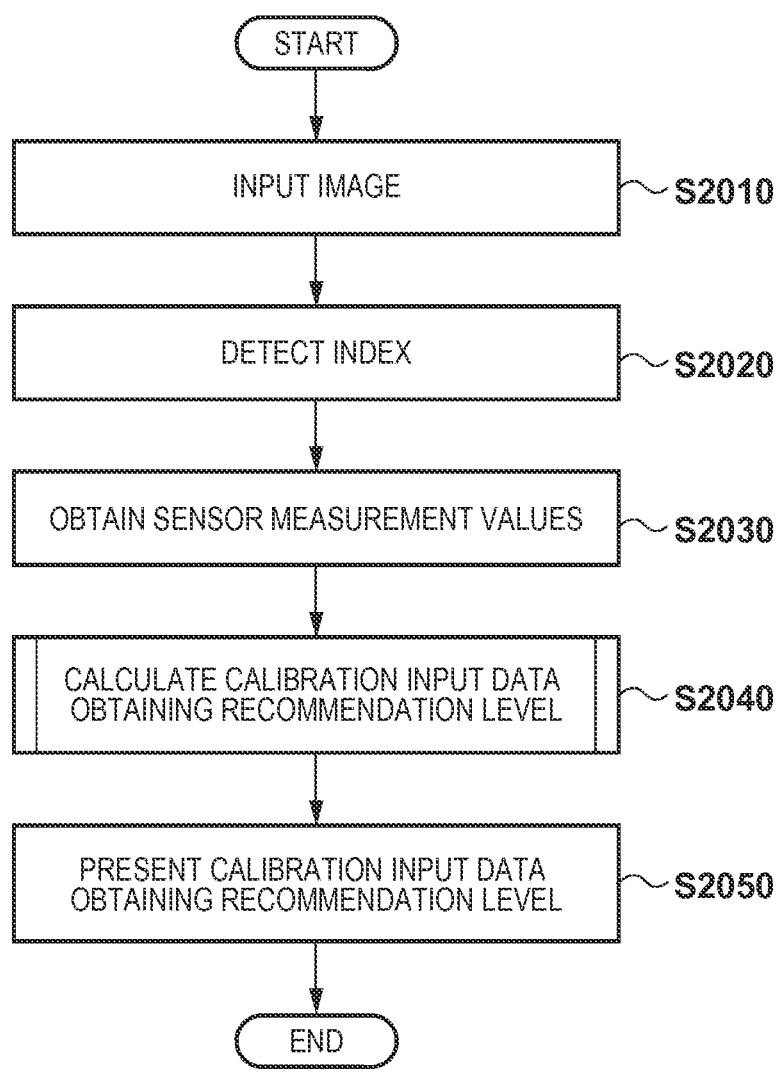
FIG. 2 is a flowchart showing the procedure of a process of displaying the obtaining recommendation level of calibration input data in the first embodiment.

The processes in steps S4010 to S4040 are the same as those in steps S2010 to S2040, respectively, shown in FIG. 2, and a description thereof will not be given. Details of the process in step S4040 are similarly the same as those in step S2040 of the flowchart shown in FIG. 3.

In step S4050, the data management unit 1040 determines whether the input data is to be used for calibration, based on the obtaining recommendation level calculated in step S4040. It may be determined that input data having, for example, an obtaining recommendation level L=2 or 3 is used for calibration. Alternatively, it may be determined that input data having an obtaining recommendation level L=3 is used for calibration. If it is determined that the input data is to be used for calibration (YES in step S4050), the process advances to step S4060. On the other hand, if it is determined that the input data is not to be used for calibration (NO in step S4050), the process returns to step S4010.

In step S4060, the data management unit 1040 holds, as calibration input data, the position and orientation of the image capturing apparatus 100 obtained in step S3050, the measurement values obtained by the position and orientation sensor 200, the three-dimensional position of the index obtained in advance, and the detection coordinate of the index.

In step S4070, the calibration information calculation unit 1070 determines whether calibration calculation is to be performed. In this embodiment, it is determined that calibration calculation is to be performed when the operator (not shown) issues an instruction to perform calibration calculation via an instruction unit (not shown). If, for example, the operator issues no instruction in a predetermined period of time, it is determined that calibration calculation is not to be performed. If it is determined that calibration calculation is to be performed (YES in step S4070), the process advances to step S4080. On the other hand, if it is determined that calibration calculation is not to be performed (NO in step S4070), the process returns to step S4010.

In step S4080, the calibration information calculation unit 1070 performs calibration calculation using the calibration input data held in the data management unit 1040. The calibration information calculation unit 1070 calculates, as calibration information, the arrangement information of the position and orientation sensor 200 mounted on the image capturing apparatus 100, that is, the position and orientation of the position and orientation sensor 200 in the image capturing apparatus coordinate system. As a calibration calculation method, any known method may be used.

In step S4090, the calibration information calculation unit 1070 determines whether the operator (not shown) has input a sensor calibration end command. If the operator has input a sensor calibration end command (YES in step S4090), the process ends. On the other hand, if the operator has not input a sensor calibration end command in a predetermined process time (NO in step S4090), the process returns to step S4010.

With the above-mentioned process, the arrangement information of the position and orientation sensor 200 mounted on the image capturing apparatus 100 relative to the image capturing apparatus 100 can be calculated as calibration information to be obtained. Upon the above-mentioned operation, a series of processes in the flowchart shown in FIG. 4 ends.

Figure 7:
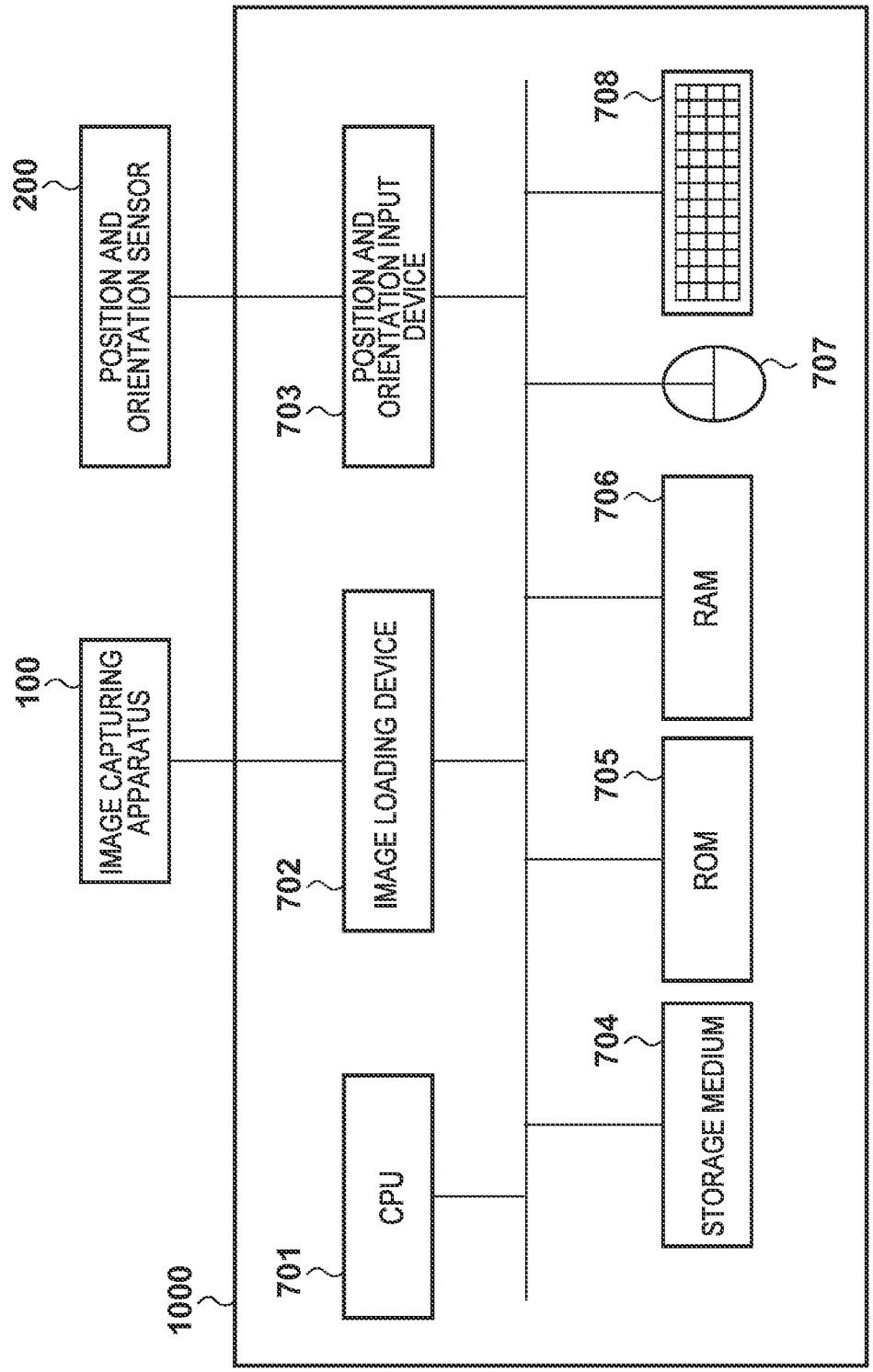
FIG. 7 is a block diagram showing the hardware configuration of the information processing apparatus 1000 in the first embodiment.

The hardware configuration of the information processing apparatus 1000 in this embodiment will be described below with reference to FIG. 7. The hardware configuration shown in FIG. 7 is the same as the configuration of a normal personal computer. The information processing apparatus 1000 includes a CPU 701, an image loading device 702, a position and orientation input device 703, a storage medium 704, a ROM 705, a RAM 706, a mouse 707, and a keyboard 708.

The CPU 701 executes a program stored in, for example, the storage medium 704, ROM 705, RAM 706, or external storage device (not shown) to control the operation of each unit from the image input unit 1010 to the calibration information calculation unit 1070 described with reference to FIG. 1. Note that the data management unit 1040 can store information on the storage medium 704, and read it out from the storage medium 704.

The image loading device 702 corresponds to the image input unit 1010, and loads an image captured by the image capturing apparatus 100 into the computer. Although the image loading device 702 is, for example, a video capture board, it may take any form as long as it loads an image captured by the image capturing apparatus 100 into the computer.

The position and orientation input device 703 corresponds to the sensor measurement value input unit 1020, and loads the measurement values obtained by the position and orientation sensor 200 into the computer.

The mouse 707 and keyboard 708 can receive an instruction from the operator.

Note that the program codes read out from the storage medium implement the functions of the above-described embodiments by themselves, and the storage medium that stores the program codes constitutes the present invention.

The present invention also includes the case wherein the functions of the above-described embodiments are implemented when the OS (operating system) running on the computer, for example, partially or wholly executes actual processing based on the instructions of the program codes.

Further, the program codes read out from the storage medium are written in the memory of a function expansion board inserted into the computer or a function expansion unit connected to the computer. Then, the CPU of the function expansion board or function expansion unit, for example, partially or wholly executes actual processing based on the instructions of the program codes.

According to this embodiment, even an operator who has neither knowledge nor expertise in sensor calibration can easily obtain sensor calibration input data, and determine whether the calibration input data is suitable for accurate calibration.

Second Embodiment

The information processing apparatus 1000 according to the first embodiment displays the obtaining recommendation level of the position and orientation sensor 200 mounted on the image capturing apparatus 100. An information processing apparatus according to the second embodiment displays an obtaining recommendation level in obtaining calibration input data for a position and orientation sensor mounted on an object to be captured. The information processing apparatus according to this embodiment will be described below.

Figure 8:
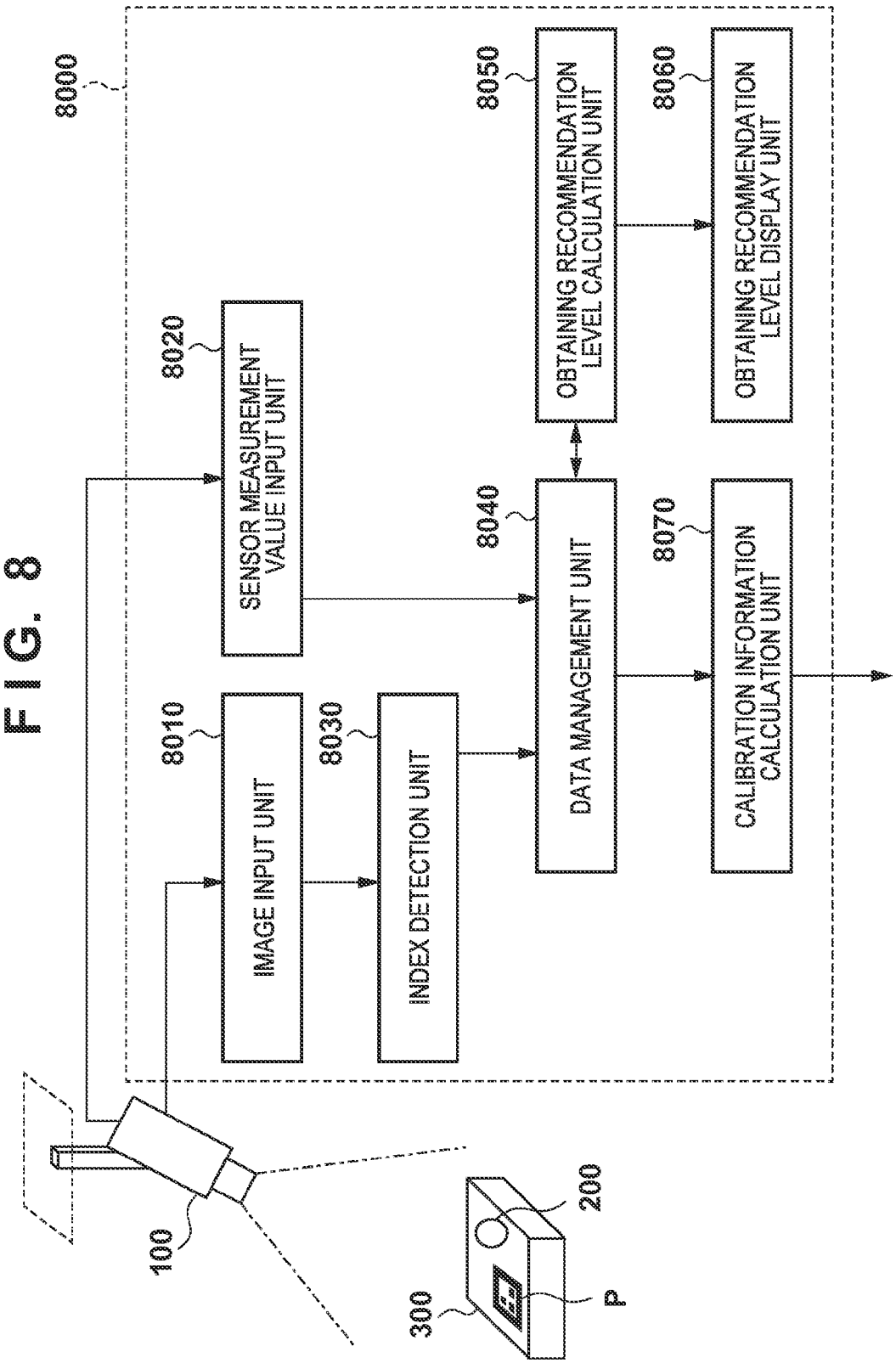
FIG. 8 is a block diagram showing the schematic configuration of an information processing apparatus 8000 in the second embodiment.

FIG. 8 shows the schematic configuration of an information processing apparatus 8000 according to this embodiment. The information processing apparatus 8000 includes an image input unit 8010, a sensor measurement value input unit 8020, an index detection unit 8030, a data management unit 8040, an obtaining recommendation level calculation unit 8050, an obtaining recommendation level display unit 8060, and a calibration information calculation unit 8070. An object 300 is mounted on a position and orientation sensor 200 to be calibrated.

The information processing apparatus 8000 is connected to an image capturing apparatus 100 and the position and orientation sensor 200 (to be described later). The image capturing apparatus 100 is fixed at a position where the object 300 can be captured. The position and orientation of the image capturing apparatus 100 in the world coordinate system are obtained in advance using a known method. Also, an object coordinate system is determined upon defining one point on the object 300 as its origin, and three orthogonal axes as its X-, Y-, and Z-axes. The position and orientation of the position and orientation sensor 200 in the object coordinate system are unknown. This unknown position and orientation of the position and orientation sensor 200 in the object coordinate system serve as information to be calibrated. An index to be captured by the image capturing apparatus 100 is set on the object 300. In this case, an index $P^k$ (k=1, . . . , K) having a known position in the world coordinate system is set on the object 300. It is desired to set an index $P^k$ so that the image capturing apparatus 100 observes pieces of information of at least three points.

The index and the function of each processing unit including the image input unit 8010, sensor measurement value input unit 8020, index detection unit 8030, data management unit 8040, and obtaining recommendation level display unit 8060 are the same as those described in the first embodiment, and a description thereof will not be given.

The obtaining recommendation level calculation unit 8050 obtains the index detection information and sensor measurement values from the data management unit 8040 as calibration input data candidates. Based on the obtained calibration input data candidates, the obtaining recommendation level calculation unit 8050 calculates an obtaining recommendation level indicating a level to determine whether the obtained calibration input data is to be used to calculate calibration information. The obtaining recommendation level calculation unit 8050 outputs the calculated obtaining recommendation level to the obtaining recommendation level display unit 8060 and data management unit 8040.

The calibration information calculation unit 8070 receives the calibration input data from the data management unit 8040, calculates the arrangement information of the position and orientation sensor 200 in the object coordinate system as calibration information, and outputs the calibration information.

The procedure of a process of displaying the obtaining recommendation level of calibration input data by the information processing apparatus 8000 according to this embodiment will be explained with reference to a flowchart shown in FIG. 9.

The processes in steps S9010, S9020, S9030, and S9050 are the same as those in steps S2010, S2020, S2030, and S2050, respectively, in the first embodiment, and a description thereof will not be given. In step S9040, the obtaining recommendation level calculation unit 8050 calculates an obtaining recommendation level in accordance with the process of a flowchart shown in FIG. 10 (to be described later).

Figure 10:
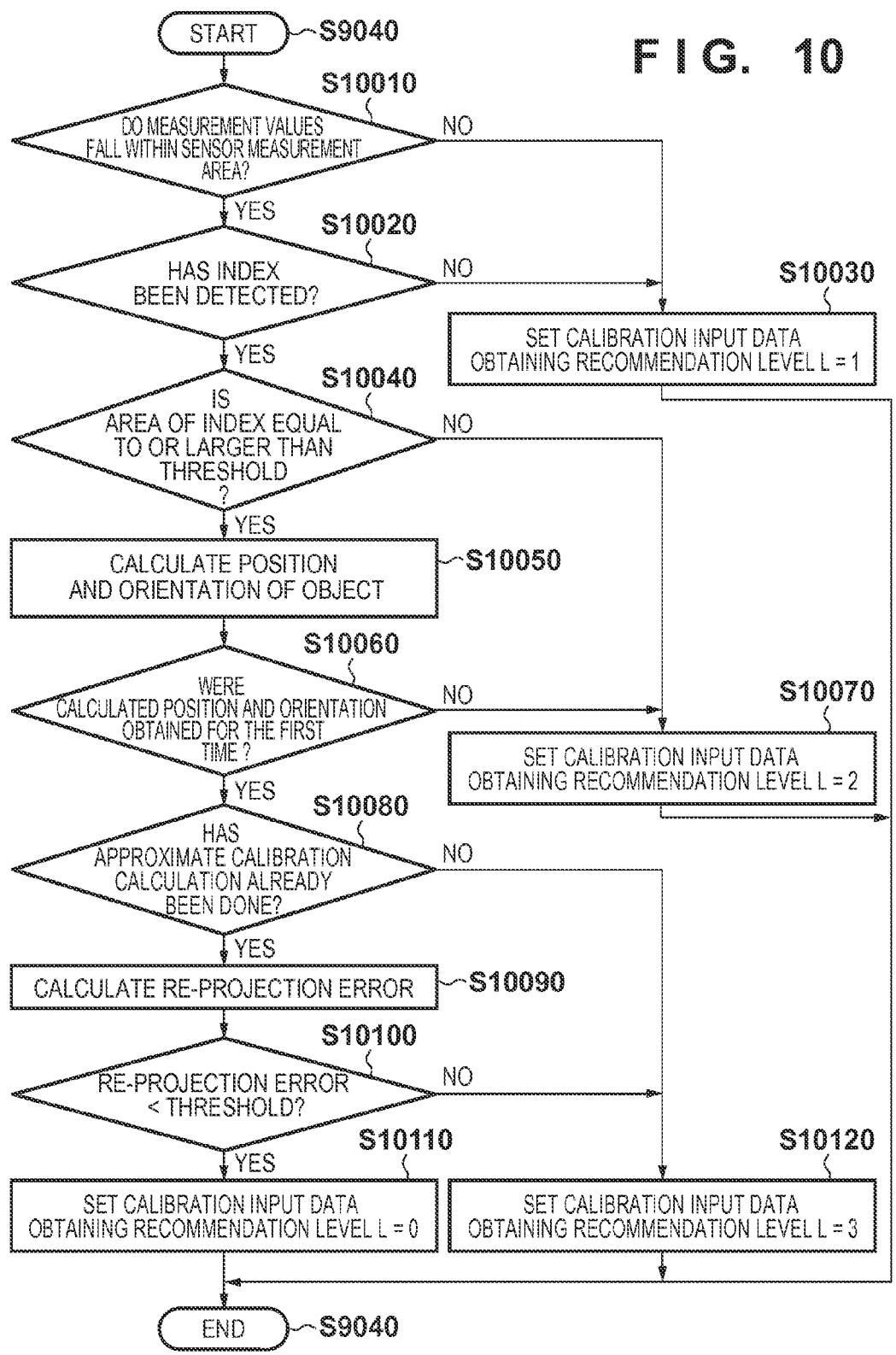
FIG. 10 is a flowchart showing the procedure of a process of calculating the obtaining recommendation level of calibration input data in the second embodiment.

FIG. 10 is a flowchart showing a method of calculating an obtaining recommendation level. The processes in steps S10010 to S10040, S10070, S10080, and S10100 to S10120 are the same as those described in the first embodiment, and a description thereof will not be given.

In step S10050, the obtaining recommendation level calculation unit 8050 calculates the position and orientation of the object 300 from the detected index. The position and orientation of the object 300 are relative to the image capturing apparatus 100. As a method of calculating the position and orientation of the object 300, a known method can be used, as in the first embodiment.

In step S10060, the obtaining recommendation level calculation unit 8050 compares the position and orientation of the object 300 calculated in step S10050 with those of the object 300 held in the data management unit 8040 as calibration input data. The obtaining recommendation level calculation unit 8050 then determines whether the position and orientation of the object 300 calculated in step S10050 were obtained for the first time. More specifically, if the difference in position of the object 300 is less than a threshold, and the difference in orientation of the object 300 is also less than a threshold, it is determined that an image was previously captured at nearly the same position and orientation; otherwise, it is determined that the position and orientation of the object 300 calculated in step S10050 were obtained for the first time. If it is determined that the position and orientation of the object 300 calculated in step S3050 were obtained for the first time (YES in step S10060), the process advances to step S10080. On the other hand, if it is determined that the position and orientation of the object 300 calculated in step S10050 were already obtained previously (NO in step S10060), the process advances to step S10070.

In step S10090, the obtaining recommendation level calculation unit 8050 calculates a re-projection error $\Delta u^{Pkn}$; that is, the difference between a detection coordinate position $u^{Pkn}$ of an index $P^{kn}$ and a coordinate position $u'^{Pkn}$ of the index $P^{kn}$, which is estimated based on the approximate calibration calculation result, the sensor measurement values, and the three-dimensional position of the index $P^{kn}$.

A method of calculating a re-projection error $\Delta u^{Pkn}$ for one index in an image captured by the image capturing apparatus 100 at a given position and orientation will be described herein. The re-projection error $\Delta u^{Pkn}$ is obtained by:

$$\Delta u^{Pkn} = u^{Pkn} - u'^{Pkn}. \tag{6}$$

Let $x_C^{Pkn} = [x_C^{Pkn}, y_C^{Pkn}, z_C^{Pkn}]$ be the position of the index $P^{kn}$ in the image capturing apparatus coordinate system, and $f$ be the focal length. Then, the estimated coordinate position $u'^{Pkn} = [u'^{Pkn}_x, u'^{Pkn}_y]$ of the index $P^{kn}$ is given by:

$$u'^{Pkn} = \begin{bmatrix} u'^{Pkn}_x & u'^{Pkn}_y \end{bmatrix}^T = \begin{bmatrix} -f\frac{x_C^{Pkn}}{z_C^{Pkn}} & -f\frac{y_C^{Pkn}}{z_C^{Pkn}} \end{bmatrix}^T. \tag{7}$$

Let $M_{WS}$ be the position and orientation of the position and orientation sensor 200 mounted on the object 300 in the world coordinate system, which are based on the measurement values obtained by the position and orientation sensor 200. Let $M_{WC}$ be the position and orientation of the image capturing apparatus 100 in the world coordinate system, which are obtained using a known method.

A 4×4 matrix $M_{OS}$ representing the position and orientation of the position and orientation sensor 200 mounted on the object 300 in the object coordinate system is represented by a six-dimensional vector $a_{OS} = [x_{OS}\ y_{OS}\ z_{OS}\ \xi_{OS}\ \psi_{OS}\ \zeta_{OS}]^T$. Transformation from $M_{OS}$ into $a_{OS}$ can be done using a known method.

Letting $x_O^{Pkn}$ be the position of the index $P^{kn}$ in the object coordinate system obtained in advance, and $M_{OS}$ be a function of $a_{OS}$ as a known parameter, the position $x_C^{Pkn}$ of the index $P^{kn}$ in the image capturing apparatus coordinate system is given by:

$$x_C^{Pkn} = [x_c^{Pkn}\ y_c^{Pkn}\ z_c^{Pkn}\ 1]^T = M_{WC}^{-1} \cdot M_{WS} \cdot M_{OS}^{-1}(a_{OS}) \cdot x_O^{Pkn}. \tag{8}$$

A re-projection error can be obtained by setting the function $a_{OS}$ describing the approximate calibration calculation result as an initial value, and substituting equations (8) and (7) into equation (6).

With the above-mentioned process, the information processing apparatus 8000 calculates and displays an obtaining recommendation level in obtaining input data for calculating the arrangement information of the position and orientation sensor 200 mounted on the object 300. Hence, even an operator who has neither knowledge nor expertise in sensor calibration can easily obtain calibration input data suitable for sensor calibration.

Figure 11:
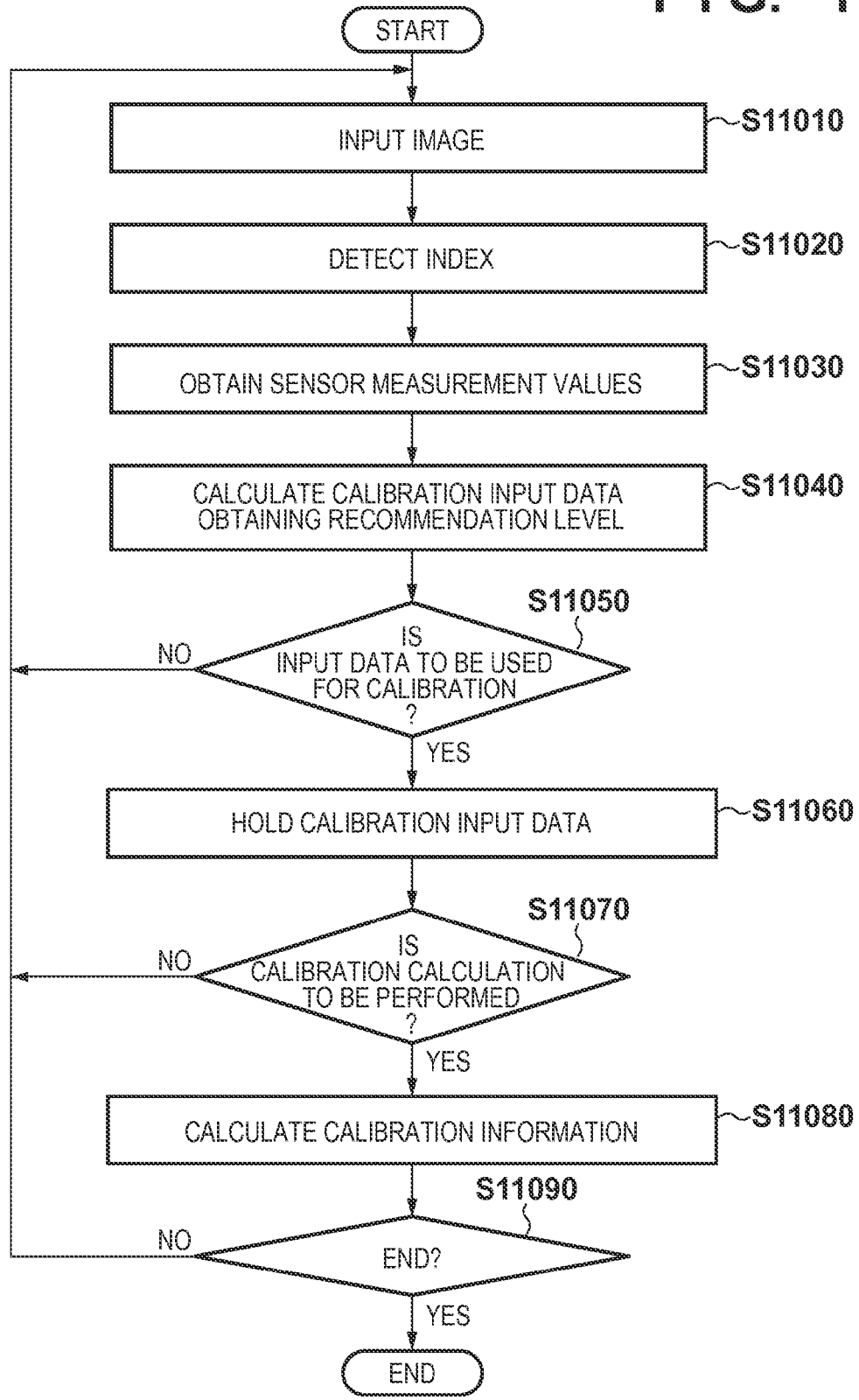
FIG. 11 is a flowchart showing the procedure of a process of calculating sensor calibration information in the second embodiment.

A process of calculating sensor calibration information based on the obtaining recommendation level will be described below with reference to a flowchart shown in FIG. 11.

Figure 9:
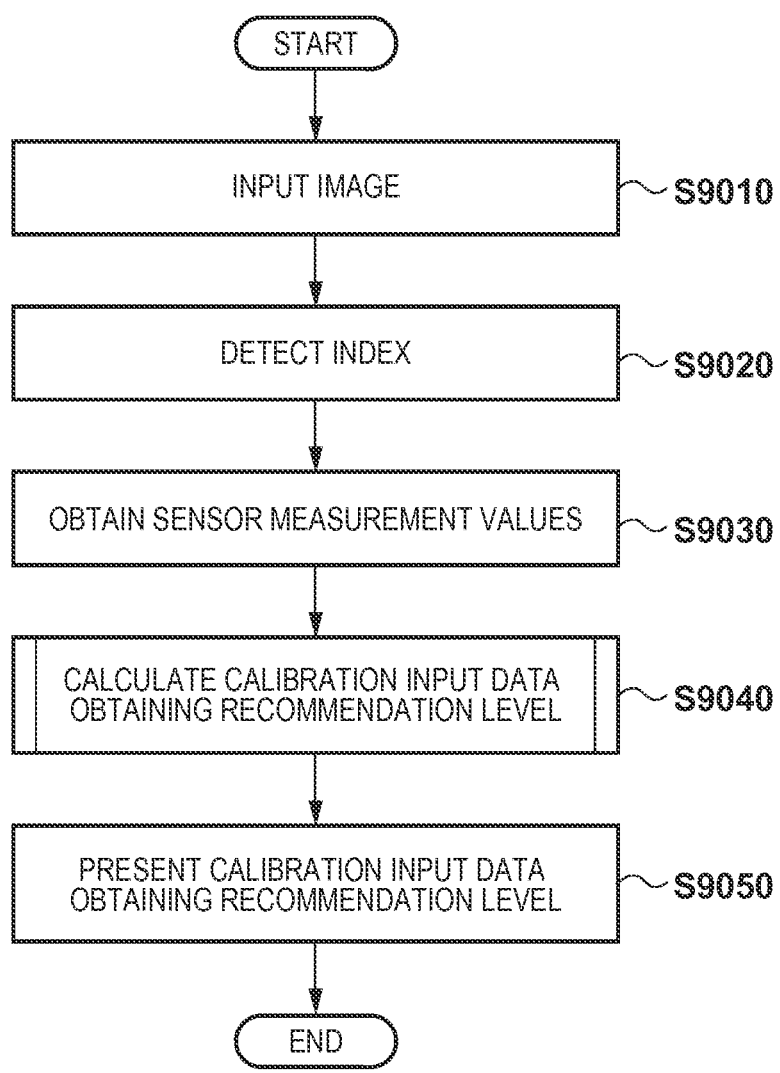
FIG. 9 is a flowchart showing the procedure of a process of displaying the obtaining recommendation level of calibration input data in the second embodiment.

The processes in steps S11010 to S11040 are the same as those in steps S9010 to S9040, respectively, shown in FIG. 9, and a description thereof will not be given. Details of the process in step S11040 are similarly the same as those in step S9040 of the flowchart shown in FIG. 10.

The processes in steps S11050, S11070, and S11090 are also the same as those in steps S4050, S4070, and S4090, respectively, described with reference to FIG. 4.

In step S11060, the data management unit 8040 holds, as calibration input data, the known position and orientation of the image capturing apparatus 100, the measurement values obtained by the position and orientation sensor 200, the known three-dimensional position of the index, and the detection coordinate of the index.

In step S11080, the calibration information calculation unit 8070 performs calibration calculation using the calibration input data held in the data management unit 8040. The calibration information calculation unit 8070 calculates, as calibration information, the arrangement information of the position and orientation sensor 200 mounted on the object 300, that is, the position and orientation of the position and orientation sensor 200 in the object coordinate system. As a calibration calculation method, any known method may be used.

With the above-mentioned process, the arrangement information of the position and orientation sensor 200 mounted on the object 300 relative to the object 300 can be calculated easily and accurately.

According to this embodiment, even an operator who has neither knowledge nor expertise in sensor calibration can easily obtain sensor calibration input data, and determine whether the calibration input data is suitable for accurate calibration.

Third Embodiment

Figure 6:
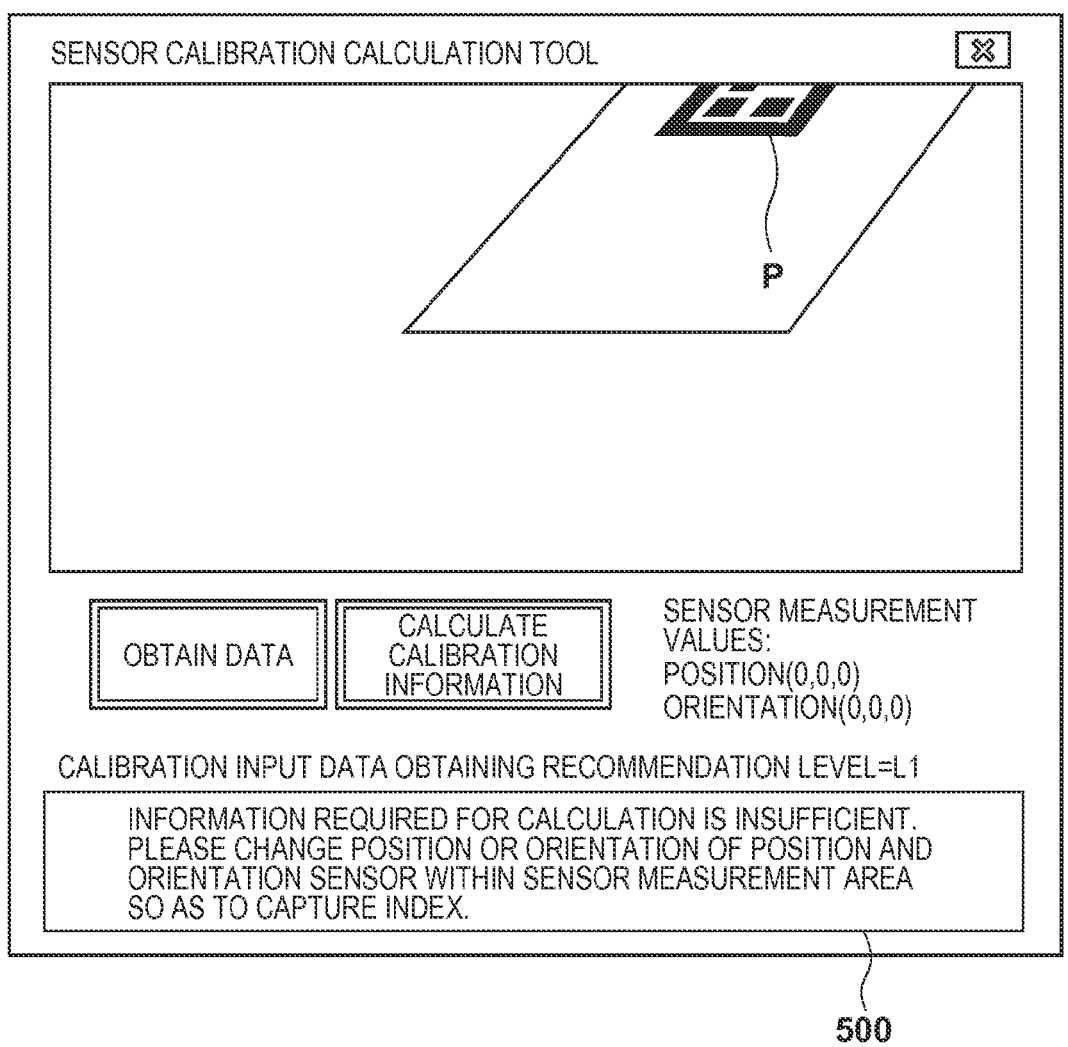
FIG. 6 is a view for explaining how to assign the obtaining recommendation level of calibration input data to the state of input data and text information that instructs the operator to perform a given operation in the third embodiment.

In the first and second embodiments, a color is assigned to the calculated obtaining recommendation level and displayed. However, an instruction given to the operator may be displayed on the liquid crystal display as text information for each obtaining recommendation level. FIG. 6 illustrates an example of how the obtaining recommendation level, the state information of input data, and information that instructs the operator to perform a given operation are displayed as text information. The state information of input data and the text information are displayed in, for example, a region 500 shown in FIG. 6. The contents to be displayed for each obtaining recommendation level will be described in detail below.

If an obtaining recommendation level L=0, calibration was previously done or input data was previously obtained at the same position, so the liquid crystal display displays "There is no need to input calibration data at the current position and orientation. Please change the position or orientation of a position and orientation sensor 200 within the measurement area of the position and orientation sensor 200."

If an obtaining recommendation level L=1, the input data cannot be used to calculate calibration information because of the insufficiency of information, so the liquid crystal display displays "Information required for calculation is insufficient. Please change the position or orientation of the position and orientation sensor 200 within the measurement area of the position and orientation sensor 200 so as to capture an index."

If an obtaining recommendation level L=2, it is determined that the input data has sufficient information required to calculate calibration information but nonetheless is expected to have a large error, so the liquid crystal display displays "The input data is expected to have a large error. Please change the position or orientation of the position and orientation sensor 200 within the measurement area of the position and orientation sensor 200."

If an obtaining recommendation level L=3, it is determined that the input data should be actively used to calibrate the position and orientation sensor 200, so the liquid crystal display displays "The input data is suitable for sensor calibration. Please obtain calibration input data while making the image capturing apparatus or the object stand still so as to prevent any blur in an image to be captured."

Note that the first half of each display content is the state information of input data, and the last half of this display content is instruction information for the operator.

As long as the state information of input data or instruction information for the operator is assigned to each content corresponding to the obtaining recommendation level, the texts displayed on the liquid crystal display are not limited to the above-mentioned examples, as a matter of course. Also, although text information corresponding to the obtaining recommendation level is displayed on the display, the present invention is not limited to this as long as the obtaining recommendation level can be presented to the operator. Speech information may be presented to the operator. When speech information is used, the operator can easily confirm the obtaining recommendation level even if he or she is away from a liquid crystal display as an accessory to a PC because, for example, the measurement area of the position and orientation sensor 200 is wide. Moreover, a color and speech may be presented in combination.

As described above, the operator can easily obtain input data suitable for sensor calibration upon display of the obtaining recommendation level as information that instructs him or her to perform a given operation.

Fourth Embodiment

In the first and second embodiments, it is determined whether the input data is to be used for calibration, based on the obtaining recommendation level. However, the operator (not shown) may input a command to obtain calibration input data based on the obtaining recommendation level displayed on the obtaining recommendation level display unit.

When the operator (not shown) inputs a data obtain command, a "Data Obtain" instruction is sent to a data management unit 1040. The operator can input this command by operating, for example, a mouse 707 or pressing a key, assigned with a specific command, using a keyboard 708. Alternatively, the operator may input this command via a GUI displayed on the liquid crystal display or may use any other method.

Fifth Embodiment

In the first and second embodiments, a color is assigned to the calculated obtaining recommendation level and displayed. However, the present invention is not limited to either example shown in FIG. 5 or FIG. 6 as long as a color can be assigned to the calculated obtaining recommendation level and displayed.

Figure 12:
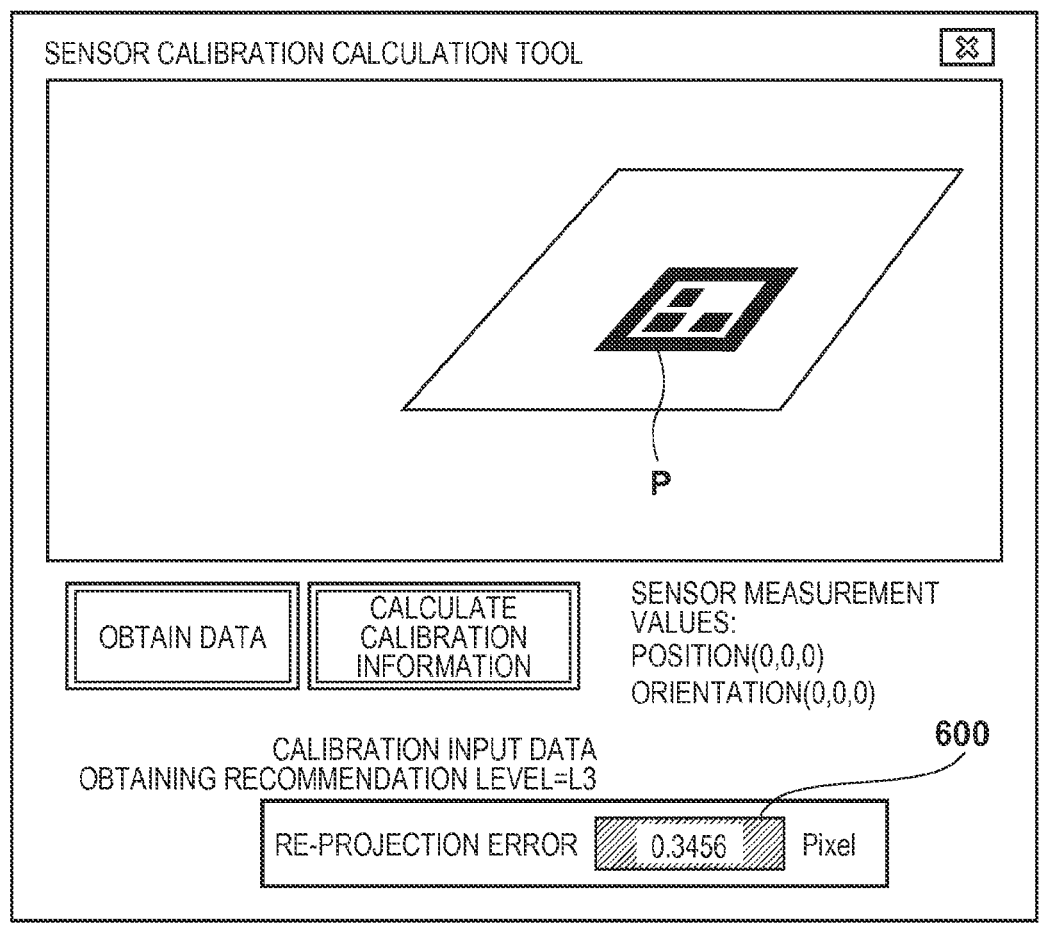
FIG. 12 is a view showing how a color corresponding to the obtaining recommendation level of calibration input data is assigned to a region 600 that displays a re-projection error in the fifth embodiment.

For example, a color corresponding to the obtaining recommendation level may be assigned to and displayed in a region 600 that displays a re-projection error, as shown in FIG. 12. Upon this display operation, the operator can know the obtaining recommendation level and the re-projection error in association with each other. This makes it easy to determine whether the input data is required for sensor calibration.

Figure 13:
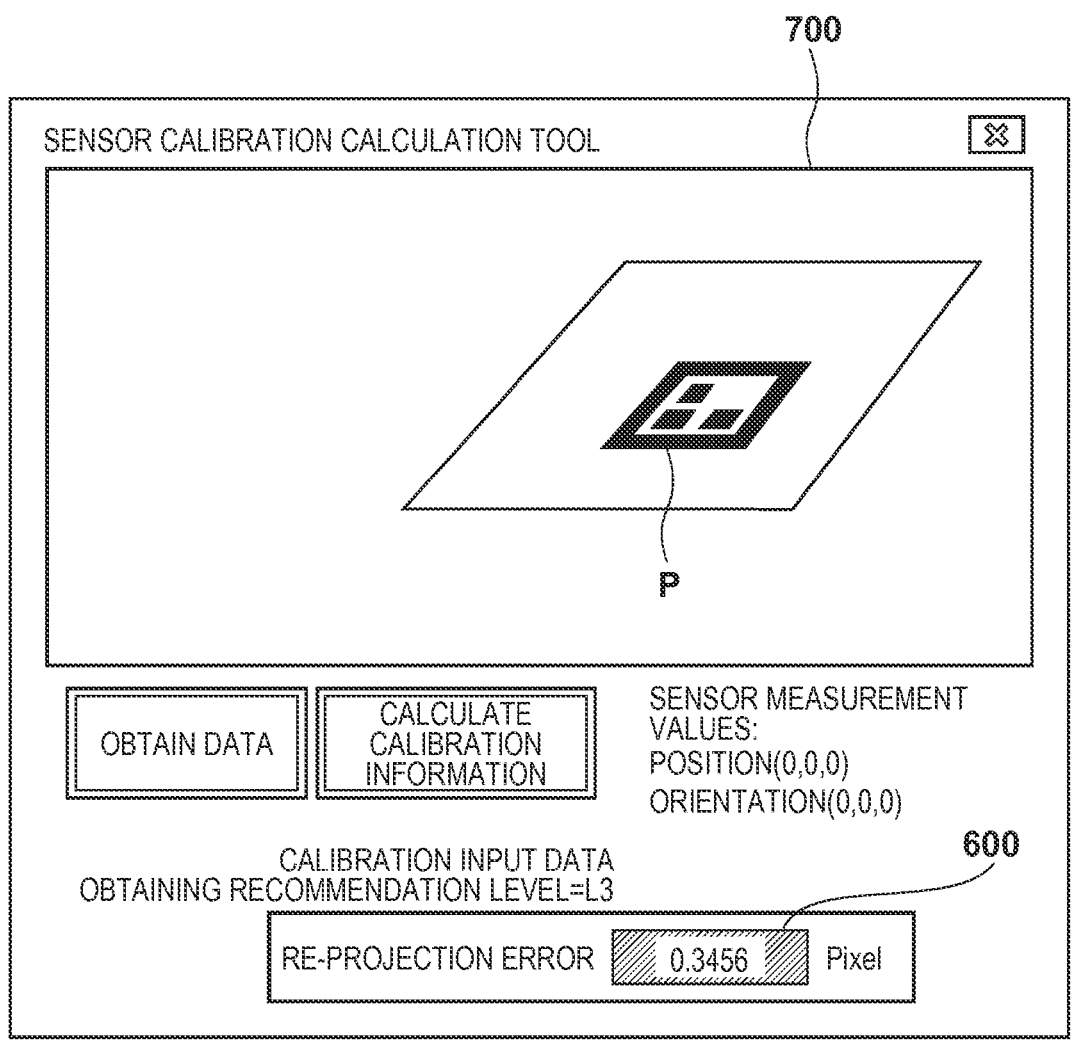
FIG. 13 is a view showing how a color corresponding to the obtaining recommendation level of calibration input data is assigned to a region 700 of an image captured by an image capturing apparatus in the fifth embodiment.

Also, a color corresponding to the obtaining recommendation level may be assigned to and displayed in a region 700 that displays an image captured by an image capturing apparatus 100, as shown in FIG. 13.

Figure 14:
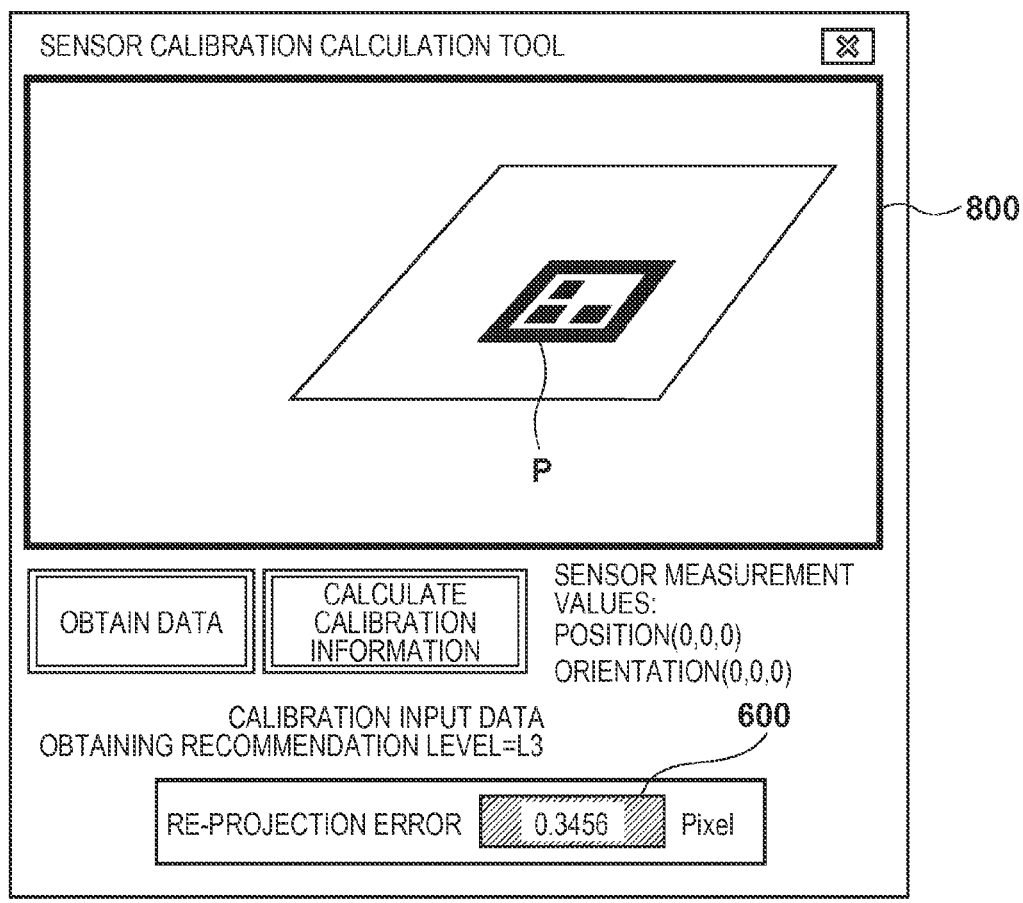
FIG. 14 is a view showing how a color corresponding to the obtaining recommendation level of calibration input data is assigned to a frame 800 of an image captured by the image capturing apparatus in the fifth embodiment.

Moreover, a color corresponding to the obtaining recommendation level may be assigned to a frame 800 of an image captured by the image capturing apparatus 100, as shown in FIG. 14.

The obtaining recommendation level display unit may adopt any method as long as a color is assigned so as to confirm the obtaining recommendation level in inputting calibration data.

Sixth Embodiment

Figure 15:
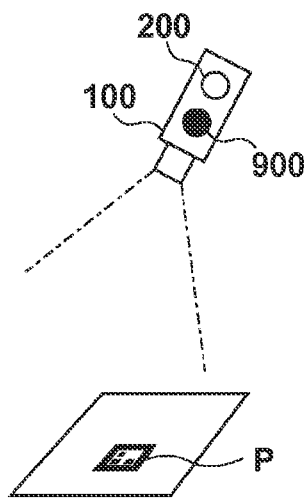
FIG. 15 is a view showing an obtaining recommendation level display unit attached to an image capturing apparatus on which a position and orientation sensor is mounted in the sixth embodiment.

In the first and second embodiments, the obtaining recommendation level display unit is implemented by a liquid crystal display as an accessory to a PC. However, the obtaining recommendation level display unit is not limited to a liquid crystal display. Any display, such as an LED or a plasma display, may be used as long as it allows the distinction between different obtaining recommendation levels. Also, an obtaining recommendation level display unit 900 may be attached to an image capturing apparatus 100 on which a position and orientation sensor 200 is mounted, as shown in FIG. 15. Note that the obtaining recommendation level display unit 900 is, for example, a compact display or an LED.

Moreover, for display in an image captured by the image capturing apparatus 100, a color corresponding to the obtaining recommendation level may be assigned to an image captured by the image capturing apparatus 100 built into an HMD (Head Mounting Display), and displayed on the HMD.

As long as a display device is attached to the image capturing apparatus 100 on which the position and orientation sensor 200 is mounted, the operator can confirm the obtaining recommendation level from a distant position even if the sensor measurement area is wide.

Seventh Embodiment

The information processing apparatus 1000 according to the first embodiment displays the obtaining recommendation level of the position and orientation sensor 200 mounted on the image capturing apparatus 100. Also, the information processing apparatus 8000 according to the second embodiment displays the obtaining recommendation level of the position and orientation sensor 200 mounted on the object 300.

However, an information processing apparatus may calculate and display an obtaining recommendation level in obtaining input data for calculating the orientation information of an orientation sensor mounted on an image capturing apparatus relative to the image capturing apparatus. The information processing apparatus according to this embodiment will be described below.

Figure 16:
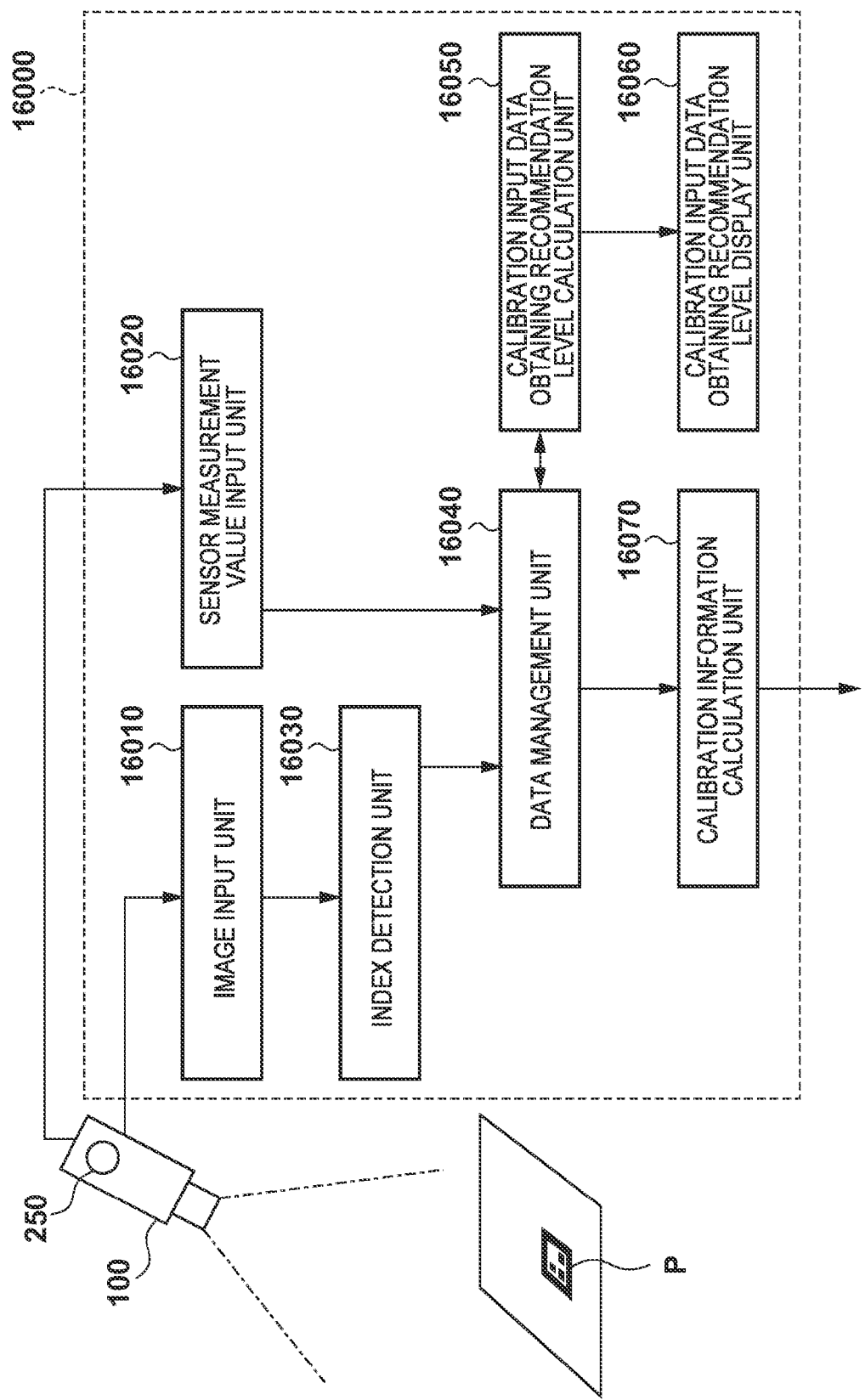
FIG. 16 is a block diagram showing the schematic configuration of an information processing apparatus 16000 in the seventh embodiment.

FIG. 16 shows the schematic configuration of an information processing apparatus 16000 according to this embodiment. The information processing apparatus 16000 includes an image input unit 16010, a sensor measurement value input unit 16020, an index detection unit 16030, a data management unit 16040, an obtaining recommendation level calculation unit 16050, an obtaining recommendation level display unit 16060, and a calibration information calculation unit 16070. The information processing apparatus 16000 is connected to an image capturing apparatus 100 and an orientation sensor 250.

The orientation sensor 250 to be calibrated is mounted on the image capturing apparatus 100. An image capturing apparatus coordinate system is determined upon defining one point on the image capturing apparatus 100 as its origin, and three orthogonal axes as its X-, Y-, and Z-axes. The orientation of the orientation sensor 250 in the image capturing apparatus coordinate system is unknown. The orientation of the orientation sensor 250 in the image capturing apparatus coordinate system is information to be calibrated.

An index P and the function of each processing unit including the image input unit 16010, the index detection unit 16030 and obtaining recommendation level display unit 16060 are the same as those described in the first embodiment, and a description thereof will not be given.

The sensor measurement value input unit 16020 obtains the measurement value of the orientation from the orientation sensor 250, and outputs this measurement value to the data management unit 16040. The measurement value output from the orientation sensor 250 generally indicates the orientation of the orientation sensor 250 itself in a sensor coordinate system uniquely defined by the sensor. In this case, the gravity axis of the sensor coordinate system coincides with that of the world coordinate system. The sensor measurement value input unit 16020 outputs a rotation matrix (to be symbolized by "$R_{WS}$" hereafter) for the orientation sensor 250 to the data management unit 16040. The obtaining recommendation level calculation unit 16050 obtains the index detection information and sensor measurement value from the data management unit 16040 as calibration input data candidates. Based on the obtained calibration input data candidates, the obtaining recommendation level calculation unit 16050 calculates an obtaining recommendation level according to which it is determined whether the obtained calibration input data is to be used to calculate calibration information. The obtaining recommendation level calculation unit 16050 outputs the calculated obtaining recommendation level to the obtaining recommendation level display unit 16060 and data management unit 16040.

The calibration information calculation unit 16070 obtains the calibration input data from the data management unit 16040, calculates the orientation information of the orientation sensor 250 in the image capturing apparatus coordinate system as calibration information, and outputs the calibration information. As a method of calculating calibration information, any known technique may be used.

The procedure of a process of displaying the obtaining recommendation level of calibration input data by the information processing apparatus 16000 according to this embodiment will be explained with reference to a flowchart shown in FIG. 17.

The processes in steps S17010, S17020, S17030, and S17050 are the same as those in steps S2010, S2020, S2030, and S2050, respectively, in the first embodiment, and a description thereof will not be given. In step S17040, the obtaining recommendation level calculation unit 16050 calculates an obtaining recommendation level in accordance with the process of a flowchart shown in FIG. 18 (to be described later).

FIG. 18 is a flowchart showing a method of calculating an obtaining recommendation level in step S17040. The processes in steps S18010 to S18080 and S18100 to S18120 are the same as those described in the first embodiment, and a description thereof will not be given.

In step S18090, the obtaining recommendation level calculation unit 16050 obtains an estimated coordinate position $u'^{Pkn}$ of an index $P^{kn}$ based on the approximate calibration calculation result, the measurement value obtained by the orientation sensor 250, the detection coordinate position of the index $P^{kn}$, and the three-dimensional position of the index $P^{kn}$ obtained in advance. The obtaining recommendation level calculation unit 16050 then need only calculate a re-projection error $\Delta u^{Pkn}$, that is, the difference between a detection coordinate position $u^{Pkn}$ of the index $P^{kn}$ and the estimated coordinate position $u'^{Pkn}$ of the index $P^{kn}$ to obtain an obtaining recommendation level using the re-projection error, as described in the first embodiment. As long as an obtaining recommendation level can be obtained, the obtaining recommendation level display unit 16060 can display an obtaining recommendation level, as in the first embodiment.

As described above, when the orientation information of an orientation sensor relative to the image capturing apparatus coordinate system is obtained to calibrate the orientation sensor as well, an obtaining recommendation level can be obtained and displayed. Upon this display operation, an operator who performs sensor calibration can easily know the obtaining recommendation level of calibration input data to obtain input data suitable for calibrating the orientation sensor.

According to the present invention, even an operator who has neither knowledge nor expertise in sensor calibration can easily obtain sensor calibration input data, and determine whether the calibration input data is suitable for accurate calibration.

Other Embodiments

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (for example, a computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
at least one processor coupled to a memory, serving as:
(i) an image obtaining unit configured to obtain an image captured by an image capturing apparatus;
(ii) an index detection unit configured to detect index information from the image;
(iii) a measurement value obtaining unit configured to obtain a measurement value measured by a sensor;
(iv) a determination unit configured to determine a suitability of the index information and the measurement value as calibration data for performing a calibration of at least one of a position and an orientation of the sensor with respect to the image capturing apparatus, based on the index information and the measurement value; and
(v) a presentation unit configured to present the suitability of the calibration data on a display area displayed on a predetermined display,
wherein the suitability as the calibration data to be presented identifiably represents a case when a capturing environment of an image from which the index information included in the calibration data is detected or a measurement environment of the measurement value is not suitable for performing the calibration, or a case when a capturing environment of an image from which the index information included in the calibration data is detected or a measurement environment of the measurement value is suitable for performing the calibration and the calibration data satisfies a predetermined condition.

2. The apparatus according to claim 1, wherein said determination unit is configured to represent the determination result of the suitability using a plurality of levels, wherein said determination unit is configured to determine the suitability of the calibration data to be presented, as different levels, at least in a case when a capturing environment of an image from which the index information included in the calibration data is detected or a measurement environment of the measurement value is not suitable for performing the calibration, or in a case when a capturing environment of an image from which the index information included in the calibration data is detected or a measurement environment of the measurement value is suitable for performing the calibration and the calibration data satisfies the predetermined condition.

3. The apparatus according to claim 2, wherein said presentation unit is further configured to present one of a color and a texture corresponding to the level.

4. The apparatus according to claim 1, wherein said presentation unit is further configured to present an instruction given to an operator as text information, together with the suitability.

5. The apparatus according to claim 4, wherein said presentation unit is further configured to present the instruction given to the operator as speech information.

6. The apparatus according to claim 1, wherein the sensor is mounted on the image capturing apparatus.

7. The apparatus according to claim 1, wherein said determination unit is configured to determine a suitability of an index based on a detection result of the index obtained by said index detection unit.

8. The apparatus according to claim 1, wherein said determination unit is configured to determine a suitability of an index based on an area of the index.

9. The apparatus according to claim 1, wherein said determination unit is configured to estimate a position of an index in the image based on the measurement value and a position of the index obtained in advance to determine a suitability of the calibration data based on a difference between the estimated position and the position of the index detected by said index detection unit.

10. The apparatus according to claim 1, wherein the sensor is a position and orientation sensor.

11. The apparatus according to claim 1, wherein the sensor is an orientation sensor.

12. The apparatus according to claim 1, wherein the determination unit is configured to determine that the capturing environment or the measurement environment is not suitable for performing the calibration in a case when an information amount of the index information included in the calibration data or the measurement value is insufficient.

13. The apparatus according to claim 1, wherein the case when a capturing environment of an image from which the index information included in the calibration data is detected or a measurement environment of the measurement value is suitable for performing the calibration and the calibration data satisfies a predetermined condition, corresponds to a case when the shift amount is less than a predetermined value between a position of the index on the image estimated based on a measurement value included in the calibration data and a position of the index on the image represented by index information included in the calibration data.

14. The apparatus according to claim 1, wherein the case when the shift amount is less than a predetermined value corresponds to a case when the calibration corresponding to the calibration data has been already performed or a case when the same calibration data has been already obtained.

15. The apparatus according to claim 1, wherein said determination unit is configured to determine the suitability of the calibration data, regardless of whether or not the calibration data satisfies a predetermined condition, in a case when a capturing environment of an image from which the index information included in the calibration data is detected or a measurement environment of the measurement value is not suitable for performing the calibration.

16. An information processing method comprising:
obtaining an image captured by an image capturing apparatus;
detecting index information from the image;
obtaining a measurement value measured by a sensor;
determining a suitability of the index information and the measurement value as calibration data for performing a calibration of at least one of a position and an orientation of the sensor with respect to the image capturing apparatus, based on the index information and the measurement value; and
presenting the suitability of the calibration data on a display area displayed on a predetermined display,
wherein the suitability as the calibration data to be presented identifiably represents a case when a capturing environment of an image from which the index information included in the calibration data is detected or a measurement environment of the measurement value is not suitable for performing the calibration, or a case when a capturing environment of an image from which the index information included in the calibration data is detected or a measurement environment of the measurement value is suitable for performing the calibration and the calibration data satisfies a predetermined condition.

17. A non-transitory computer-readable storage medium storing a computer program that, when run on a computer, causes the computer:
to obtain an image captured by an image capturing apparatus;
to detect index information from the image;
to obtain a measurement value measured by a sensor;
to determine a suitability of the index information and the measurement value as calibration data for calibrating at least one of a position and an orientation of the sensor with respect to the image capturing apparatus, based on the index information and the measurement value; and
to present the suitability of the calibration data on a display area displayed on a predetermined display,
wherein the suitability as the calibration data to be presented identifiably represents a case when a capturing environment of an image from which the index information included in the calibration data is detected or a measurement environment of the measurement value is not suitable for performing the calibration, or a case when a capturing environment of an image from which the index information included in the calibration data is detected or a measurement environment of the measurement value is suitable for performing the calibration and the calibration data satisfies a predetermined condition.

18. An information processing apparatus that evaluates whether index information detected from an image captured by an image capturing apparatus is appropriate as calibration input data to calibrate arrangement information of a sensor with respect to the image capturing apparatus, the information processing apparatus comprising:
at least one processor coupled to a memory, serving as:
(i) an image obtaining unit configured to obtain an image captured by the image capturing apparatus;
(ii) an index detection unit configured to detect index information from the image and to obtain a position at which the index information is detected in the image;
(iii) a measurement value obtaining unit configured to obtain a measurement value measured by the sensor;
(iv) an evaluation unit configured to evaluate whether the index information detected from the image is appropriate as calibration input data to calibrate the arrangement information, based on whether information amount of index information detected from the image is sufficient or based on a shift amount between a position of the index in the image estimated based on the measurement value and a position of the index in the image obtained by the index detection unit; and
(v) a display control unit configured to display a result of the evaluation unit, on a predetermined display,
wherein the display control unit is configured to display a result of the evaluation unit on the predetermined display, such that at least a case when an information amount of index information detected from the image is insufficient and a case when the shift amount is less than a predetermined value are identifiable for each other.

19. The apparatus according to claim 18, wherein the sensor is a position and orientation sensor.

20. The apparatus according to claim 18, wherein the sensor is an orientation sensor.

21. The apparatus according to claim 18, wherein the display control unit is further configured to display information representing the shift amount with the result of the evaluation unit, on a predetermined display, wherein the shift amount is displayed as text information and a result of the evaluation unit is displayed as non-text information on the predetermined display.

22. An information processing apparatus that evaluates whether index information detected from an image captured by an image capturing apparatus is appropriate as calibration input data to calibrate arrangement information of a sensor with respect to an object to be captured by the image capturing apparatus, the information processing apparatus comprising:
at least one processor coupled to a memory, serving as:
(i) an image obtaining unit configured to obtain an image captured by the image capturing apparatus;
(ii) an index detection unit configured to detect index information from the image and to obtain a position at which the index information is detected in the image;
(iii) a measurement value obtaining unit configured to obtain a measurement value measured by the sensor;
(iv) an evaluation unit configured to evaluate whether the index information detected from the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
(v) a display control unit configured to display a result of the evaluation unit, on a predetermined display,
wherein the display control unit is configured to display a result of the evaluation unit on the predetermined display, such that at least a case when an information amount of index information detected from the image is insufficient and a case when the shift amount is less than a predetermined value are identifiable for each other.

23. The apparatus according to claim 22, wherein the sensor is a position and orientation sensor.

24. The apparatus according to claim 22, wherein the sensor is an orientation sensor.

25. An information processing apparatus that evaluates whether an image captured by an image capturing apparatus is appropriate for processing to calibrate arrangement information of a sensor with respect to the image capturing apparatus, the information processing apparatus comprising:
at least one processor coupled to a memory, serving as:
(i) an image obtaining unit configured to obtain an image captured by the image capturing apparatus;
(ii) an index detection unit configured to detect index information from the image and to obtain a position at which the index information is detected in the image;
(iii) a measurement value obtaining unit configured to obtain a measurement value measured by the sensor;
(iv) an evaluation unit configured to evaluate whether the image is appropriate for processing to calibrate the arrangement information, based on whether an information amount of index information detected from the image is sufficient or based on a shift amount between a position of the index in the image estimated based on the measurement value and a position of the index in the image obtained by the index detection unit; and
(v) a display control unit configured to display a result of the evaluation unit, on a predetermined display,
wherein the display control unit is configured to display a result of the evaluation unit on the predetermined display, such that at least a case when an information amount of index information detected from the image is insufficient and a case when the shift amount is less than a predetermined value are identifiable for each other.

26. The apparatus according to claim 25, wherein the sensor is a position and orientation sensor.

27. The apparatus according to claim 25, wherein the sensor is an orientation sensor.

28. An information processing apparatus that evaluates whether an image captured by an image capturing apparatus is appropriate for processing to calibrate arrangement information of a sensor with respect to an object to be captured by the image capturing apparatus, the information processing apparatus comprising:
at least one processor coupled to a memory, serving as:
(i) an image obtaining unit configured to obtain an image captured by the image capturing apparatus;
(ii) an index detection unit configured to detect index information from the image and to obtain a position at which the index information is detected in the image;
(iii) a measurement value obtaining unit configured to obtain a measurement value measured by the sensor;
(iv) an evaluation unit configured to evaluate whether the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
(v) a display control unit configured to display a result of the evaluation unit, on a predetermined display,
wherein the display control unit is configured to display a result of the evaluation unit on the predetermined display, such that at least a case when an information amount of index information detected from the image is insufficient and a case when the shift amount is less than a predetermined value are identifiable for each other.

29. The apparatus according to claim 28, wherein the sensor is a position sensor and orientation sensor.

30. The apparatus according to claim 28, wherein the sensor is an orientation sensor.

31. An information processing method that evaluates whether index information detected from an image captured by an image capturing apparatus is appropriate as calibration input data to calibrate arrangement information of a sensor with respect to the image capturing apparatus, the method comprising:
obtaining an image captured by the image capturing apparatus;
detecting index information from the image and obtaining a position at which the index information is detected in the image;
obtaining a measurement value measured by the sensor;
evaluating whether the index information detected from the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

32. A non-transitory computer-readable storage medium storing a program that, when run on a computer, causes the computer to execute an information processing method that evaluates whether an image captured by an image capturing apparatus is appropriate for processing to calibrate arrangement information of a sensor with respect to an object to be captured by the image capturing apparatus, the method comprising:
obtaining an image captured by the image capturing apparatus;
detecting index information from the image and obtaining a position at which the index information is detected in the image;
obtaining a measurement value measured by the sensor;
evaluating whether the index information detected from the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

33. An information processing method that evaluates whether index information detected from an image captured by an image capturing apparatus is appropriate as calibration input data to calibrate arrangement information of a sensor with respect to an object to be captured by the image capturing apparatus, the method comprising:
obtaining an image captured by the image capturing apparatus;
detecting index information from the image and obtaining a position at which the index information is detected in the image;
obtaining a measurement value measured by the sensor;
evaluating whether the index information detected from the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

34. A non-transitory computer-readable storage medium storing a program that, when run on a computer, causes the computer to execute an information processing method that evaluates whether index information detected from an image captured by an image capturing apparatus is appropriate for processing to calibrate arrangement information of a sensor with respect to an object to be captured by the image capturing apparatus, the method comprising:
  obtaining an image captured by the image capturing apparatus;
  detecting index information from the image and obtaining a position at which the index information is detected in the image;
  obtaining a measurement value measured by the sensor;
  evaluating whether the index information detected from the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
  displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

35. An information processing method that evaluates whether an image captured by an image capturing apparatus is appropriate for processing to calibrate arrangement information of a sensor with respect to the image capturing apparatus, the method comprising:
  obtaining an image captured by the image capturing apparatus;
  detecting index information from the image and obtaining a position at which the index information is detected in the image;
  obtaining a measurement value measured by the sensor,
  evaluating whether the image is appropriate for processing to calibrate the arrangement information, based on a shift amount between a position of the index in the image estimated based on whether an information amount of index information detected from the image is sufficient or based on the measurement value and a position of the index in the image obtained by the index detection unit; and
  displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

36. A non-transitory computer-readable storage medium storing a program that, when run on a computer, causes the computer to execute an information processing method that evaluates whether an image captured by an image capturing apparatus is appropriate for processing to calibrate arrangement information of a sensor with respect to the image capturing apparatus, the method comprising:
  obtaining an image captured by the image capturing apparatus;
  detecting index information from the image and obtaining a position at which the index information is detected in the image;
  obtaining a measurement value measured by the sensor,
  evaluating whether the image is appropriate for processing to calibrate the arrangement information, based on a shift amount between a position of the index in the image estimated based on whether an information amount of index information detected from the image is sufficient or based on the measurement value and a position of the index in the image obtained by the index detection unit; and
  displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

37. An information processing method that evaluates whether an image captured by an image capturing apparatus is appropriate for processing to calibrate arrangement information of a sensor with respect to the image capturing apparatus, the method comprising:
  obtaining an image captured by the image capturing apparatus;
  detecting index information from the image and obtaining a position at which the index information is detected in the image;
  obtaining a measurement value measured by the sensor;
  evaluating whether the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and
  displaying a result of the evaluation on a predetermined display, wherein the displaying of the result is configured to display a result of the evaluating on the predetermined display, such that at least a case when an information amount of index information detected from the image is insufficient and a case when the shift amount is less than a predetermined value are identifiable for each other.

38. A non-transitory computer-readable storage medium storing a program that, when run on a computer, causes the computer to execute an information processing method that evaluates whether an image captured by an image capturing apparatus is appropriate for processing to calibrate arrangement information of a sensor with respect to the image capturing apparatus, the method comprising:
  obtaining an image captured by the image capturing apparatus;
  detecting index information from the image and obtaining a position at which the index information is detected in the image;
  obtaining a measurement value measured by the sensor;
  evaluating whether the image is appropriate as calibration input data to calibrate the arrangement information, based on whether an information amount of index information detected from the image is sufficient or based on a shift amount between a position of the index in the image estimated based on the measurement value and a position of the index in the image obtained by the index detection unit; and displaying a result of the evaluation on a predetermined display, wherein the displaying of the result is configured to display a result of the evaluating unit on the predetermined display, such that at least a case when an information amount of index information detected from the image is insufficient and a case when the shift amount is less than a predetermined value are identifiable for each other.

* * * * *